(12) United States Patent
Arita et al.

(10) Patent No.: US 6,781,779 B2
(45) Date of Patent: Aug. 24, 2004

(54) MAGNETIC RECORDING MEDIUM, ITS PRODUCTION METHOD AND MAGNETIC RECORDING APPARATUS

(75) Inventors: Yoji Arita, Yokohama (JP); Hiroyuki Ikeda, Yokohama (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 479 days.

(21) Appl. No.: 09/854,679

(22) Filed: May 15, 2001

(65) Prior Publication Data

US 2002/0027732 A1 Mar. 7, 2002

(30) Foreign Application Priority Data

May 16, 2000 (JP) .................................. 2000-142957
Jun. 30, 2000 (JP) .................................. 2000-197559

(51) Int. Cl.$^7$ .............................................. G11B 5/02
(52) U.S. Cl. .................. 360/59; 360/55; 360/97.01; 360/135
(58) Field of Search ................... 360/55, 59, 97.01, 360/135

(56) References Cited

U.S. PATENT DOCUMENTS

| | | | |
|---|---|---|---|
| 3,869,711 A | 3/1975 | Bernard et al. ............... | 360/16 |
| 5,248,990 A | 9/1993 | Ishikawa et al. ............. | 346/1.1 |
| 5,325,244 A | 6/1994 | Takano et al. ............. | 360/77.03 |
| 5,991,104 A | 11/1999 | Bonyhard .................... | 360/15 |
| 6,359,747 B1 | 3/2002 | Kuo ............................ | 360/75 |

FOREIGN PATENT DOCUMENTS

| | | |
|---|---|---|
| EP | 0 125 535 | 11/1984 |
| EP | 0 915 456 | 5/1999 |
| JP | 60-64376 | 4/1985 |
| JP | 62-43816 | 2/1987 |
| JP | 62-192025 | 8/1987 |
| JP | 63-166050 | 7/1988 |
| JP | 4-34744 | 2/1992 |
| WO | WO 99/30318 | 6/1999 |
| WO | WO 01/35396 | 5/2001 |

OTHER PUBLICATIONS

H. Horimai, et al., 9pA–11, p. 223, "High–Density Storage by Means of Magnetic Holography on Amorphous Tb–Fe Thin Films", Nov. 1983.
M. Nishikawa, et al., pp. 1–3 and GP–06, "Readback Properties of Novel Magnetic Contact Duplication of High Recording Density Floppy Disk", Feb. 10, 2000.
U.S. patent application Ser. No. 09/773,610, filed Feb. 2, 2001.
U.S. patent application Ser. No. 09/854,679, filed May 15, 2001.
U.S. patent application Ser. No. 10/058,872, filed Jan. 24, 2002.
U.S. patent application Ser. No. 10/212,688, filed Aug. 7, 2002.
U.S. patent application Ser. No. 10/022,875, filed Dec. 20, 2001.

*Primary Examiner*—David Hudspeth
*Assistant Examiner*—Glenda P Rodriguez
(74) *Attorney, Agent, or Firm*—Oblon, Spivak, McClelland, Maier Neustadt, P.C.

(57) ABSTRACT

A magnetic recording medium for recording information by forming a magnetic pattern for information thereon by a magnetic head, which is a longitudinal magnetic recording medium having a coercive force of at least 3000 Oe, and which has a magnetic pattern for control of the magnetic head preliminarily formed thereon, wherein the full width at half maximum of an isolated pulse of a reproducing signal of the magnetic pattern for control is smaller than the full width at half maximum of an isolated pulse of a reproducing signal of the magnetic pattern for information.

19 Claims, 5 Drawing Sheets

Track direction

F I G. 5
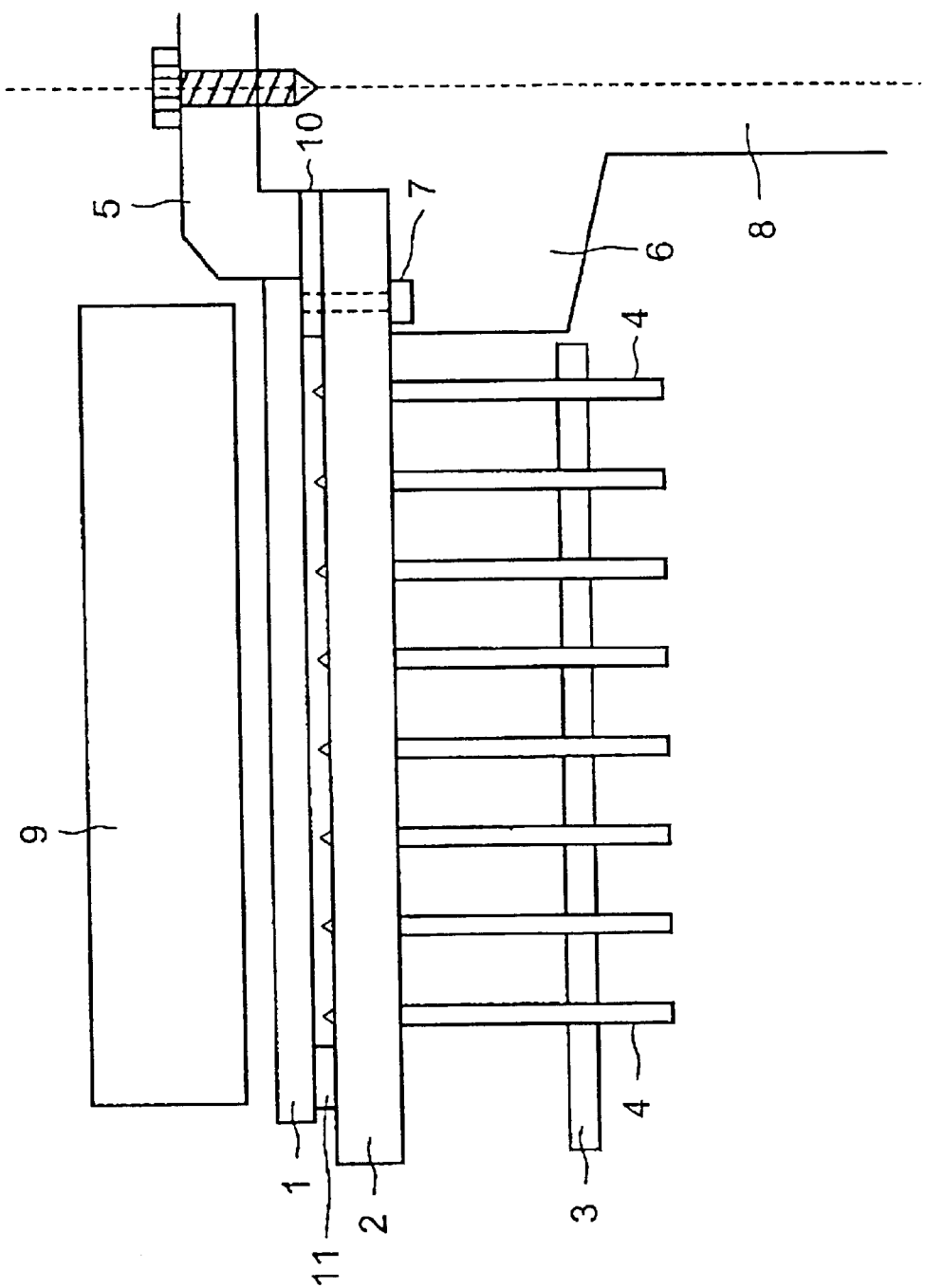

MAGNETIC RECORDING MEDIUM, ITS PRODUCTION METHOD AND MAGNETIC RECORDING APPARATUS

The present invention relates to a magnetic recording medium and its production method and a magnetic recording apparatus. Particularly, it relates to a magnetic recording medium carrying out recording and reproducing by a flying/contact magnetic head and its production method and a magnetic recording medium.

A magnetic recording apparatus represented by a magnetic disk apparatus (hard disk drive) has been widely used as an outboard recording apparatus of an information processing apparatus such as a computer, and in recent years, it has been used also as a recording apparatus for dynamic images or as a recording apparatus for a set-top box.

A magnetic disk apparatus usually consists of a shaft which fixes one or plurality of magnetic disks in a skewered state, a motor which is bonded to said shaft by means of a bearing and which rotates the magnetic disk, a magnetic head which is used for recording and/or reproducing, an arm to which said head is attached, and an actuator capable of moving the head to an optional position on the magnetic recording medium by means of the head arm. The head for recording and reproducing is usually a flying head, and moves on the magnetic recording medium with a certain flying height.

Further, in addition to the flying head, use of a contact head has also been proposed so as to further shorten the distance from the medium.

The magnetic recording medium to be mounted on the magnetic disk apparatus is prepared usually by forming a NiP layer on the surface of a substrate made of e.g. an aluminum alloy, conducting a required smoothing treatment, texturing treatment or the like, and subsequently forming e.g. a metal base layer, a magnetic layer (information recording layer), a protective layer and a lubricant layer thereon. Otherwise, it may be formed by subsequently forming e.g. a metal base layer, a magnetic layer (information recording layer), a protective layer and a lubricant layer on the surface of a substrate made of e.g. glass. As the magnetic recording medium, a longitudinal magnetic recording medium and a perpendicular magnetic recording medium are mentioned. On the longitudinal magnetic recording medium, longitudinal recording is usually conducted.

The protective layer on the magnetic layer prevents damages of the magnetic layer due to impact of the flying magnetic head or sliding of the contact head, and the lubricant layer imparts lubricity between the magnetic head and the medium. By the present constitution, recording and reproducing by a flying/contact magnetic head becomes possible. Use of a flying/contact head can shorten the distance between the magnetic layer and the head, whereby information recording with a significantly high density becomes possible as compared with an optical disk or a photomagnetic disk employing a head of another type.

The density of the magnetic recording medium becomes high acceleratingly year by year, and the density becomes high by an annual rate of at least 60% in recent years. Many technique may be mentioned to realize this high density, and it is attempted, for example, to employ a GMR head as a magnetic head which is a magnetic head having its flying height decreased, to improve the magnetic material to be used for a recording layer of the magnetic disk, or to shorten the space between information recording tracks in the magnetic disk.

In each track, a magnetic pattern for control which controls the magnetic head, such as a signal to be used for position control of the magnetic head or a signal to be used for synchronous control, is formed. If the space between the information recording tracks is shortened to increase the number of tracks, signals to be used for position control of the data recording/reproducing head (hereinafter sometimes referred to as servo signals) have to be dense relative to the radius direction of the disk correspondingly, i.e. more signals have to be provided to carry out precise control.

Further, it is also strongly required to decrease the region other than the region to be used for data recording, i.e. the region used for the servo signals and the gaps between the servo region and the data recording region, in order to enlarge the data recording region and to increase the data recording capacity. Accordingly, it is necessary to increase output of the servo signals and to increase precision of the synchronous signals.

A method which has been used widely as a servo signal forming method is to make a hole in the vicinity of a head actuator of a drive (magnetic recording apparatus), insert a pin equipped with an encoder to the hole, engage said pin with the actuator, and drive the head to a precise position to record the servo signals. However, by this method, no higher precision than the limit of the recording by a magnetic head can be obtained.

Accordingly, as a magnetic printing method to a magnetic disk, a method of patterning a soft magnetic material to a master disk and contacting the master disk with a magnetic disk, which is used as a shield, and applying a magnetic field from the exterior to print the magnetic pattern, has been proposed (JP-A-50-60212 (U.S. Pat. No. 3,869,711), JP-A-10-40544 (European Patent No. 915456), "Readback Properties of Novel Magnetic Contact Duplication Signals with High Recording Density FD" (Sugita, R et. al, Digest of InterMag 2000, GP-06, published by IEEE)).

However, this method can be applied to a hard disk or a floppy disk having a low coercive force, but can hardly be applied to a magnetic disk having a high coercive force.

For example, the literature by Sugita et. al reports results of application of the magnetic printing method to a floppy disk and reports that excellent results of e.g. PW50 can be obtained. However, (1) the coercive force is 2,300 Oe and relatively low, and printing can be carried out with a small external magnetic field. Further, it is considered that conditions are suitable for magnetic printing, such that (2) a floppy disk has flexibility and is likely to be in contact with a master disk, (3) the magnetic pattern to be formed is broad with a width of 5 $\mu$m or 10 $\mu$m, and it is easy to improve PW50, and (4) a floppy disk usually has no protective layer, whereby magnetic printing can easily be carried out.

In recent years, the coercive force of a longitudinal hard disk exceeds 3 kOe. If the coercive force of a magnetic disk is large, a larger external magnetic field is required for magnetic printing, however, if the external magnetic field is made large, the magnetic field which leaks to the surrounding becomes significant, whereby the leakage magnetic field can not adequately be shielded at the pattern boundary. Accordingly, the magnetic transition region becomes unclear, and the signal quality such as PW50 may be impaired.

Further, it is very difficult to completely contact the master disk with the magnetic recording medium to which magnetic printing is applied, and the medium may have a flaw due to the contact.

On the other hand, with respect to a perpendicular hard disk which has been developed in recent years, it is difficult to shield it by the soft magnetic material, and accordingly, it is more difficult to apply the magnetic printing method.

Under these circumstances, it is an object of the present invention to provide a magnetic recording medium having improved precision and output of signals for control such as servo signals and synchronous signals, and a method for forming a magnetic pattern for control, and to provide a magnetic recording medium with which a high density recording can be carried out and a magnetic recording apparatus in a short period of time at a low cost.

According to a first aspect of the present invention, there is provided a magnetic recording medium for recording information by forming a magnetic pattern for information thereon by a magnetic head, which is a longitudinal magnetic recording medium having a coercive force of at least 3000 Oe, and which has a magnetic pattern for control of the magnetic head preliminarily formed thereon, wherein the full width at half maximum of an isolated pulse of a reproducing signal of the magnetic pattern for control is smaller than the full width at half maximum of an isolated pulse of a reproducing signal of the magnetic pattern for information.

Namely, when a medium on which a magnetic pattern is formed by a magnetic head to record information, such as a hard disk, is a longitudinal recording medium having a high coercive force of at least 3,000 Oe, small magnetic domains can be formed clearly, and a high density recording can be carried out. By forming a magnetic pattern for control with a narrow magnetic transition region on a medium to narrow the full width at half maximum of an isolated pulse of the reproducing signal of the magnetic pattern for control (the width at the half of the maximum value of the amplitude of an isolated pulse, hereinafter sometimes referred to as PW50 (Pulse Width 50%)) so that it is smaller than the full width at half maximum of an isolated pulse of the reproducing signal for the magnetic pattern for information, the synchronous precision and the position precision of the magnetic head can be increased, whereby the high density recording medium having a high reliability can be provided. When this is applied to a medium having a higher coercive force of at least 3,300 Oe, the reliability is high, recording can be carried out with a higher density, and the effect is great.

According to a second aspect of the present invention, there is provided a magnetic recording medium for recording information by forming a magnetic pattern for information thereon by a magnetic head, which is a perpendicular magnetic recording medium, and which has a magnetic pattern for control of the magnetic head preliminarily formed thereon, wherein the full width at half maximum of an isolated pulse of a reproducing signal of the magnetic pattern for control is smaller than the full width at half maximum of an isolated pulse of a reproducing signal of the magnetic pattern for information.

In the second aspect of the present invention, by making the full width at half maximum of an isolated pulse of the reproducing signal of the magnetic pattern for control to be at most 95% of the full width at half maximum of an isolated pulse of the reproducing signal of the magnetic pattern for information, the synchronous precision and the position precision of the magnetic head can further be increased, and a high density recording medium having a higher reliability can be provided. It is more preferably at most 90%.

Here, the magnetic pattern in the present invention indicates such a state that magnetic domains are arranged to generate a signal. The magnetic pattern for control is a magnetic pattern which generates control signals such as servo signals for position control of the magnetic head or synchronous signals for synchronous control. The full width at half maximum of an isolated pulse of the reproducing signal is a pulse width (width of time or length) at an output of 50% of the maximum output (0-to-peak value) of a certain isolated pulse in the reproducing signal waveform and is also referred to as PW50.

According to a third aspect of the present invention, there is provided a magnetic recording medium for recording information by forming a magnetic pattern for information thereon by a magnetic head, which has a magnetic pattern for control of the magnetic head preliminarily formed thereon, wherein the magnetic pattern for control comprises at least two types of linear patterns which form angles of $(90\pm\theta_1)$ degree and $(90\pm\theta_2)$ degree wherein $\theta_1>\theta_2$, $0°<\theta_1\leq 45°$ and $0°\leq\theta_2<45°$, respectively, with the relative movement direction of the magnetic head, and which satisfy the formula:

$$P(90\pm\theta_1)/P(90\pm\theta_2)\geq 0.9\times\cos(\theta_1-\theta_2)$$

where $P(90\pm\theta_1)$ and $P(90\pm\theta_2)$ are outputs of the isolated pulses of reproducing signals of said linear patterns.

Namely, with respect to a medium on which a magnetic pattern is formed by a magnetic head to record information such as a hard disk, by using, as a magnetic pattern for control, an inclined linear pattern represented by a magnetic pattern for position control by phase control, position control of the magnetic head can be carried out with a high precision. By increasing the output of such an inclined linear pattern to satisfy the above formula, the position precision of the magnetic head can be increased.

Accordingly, the present invention is extremely effective when applied to a case of including a magnetic pattern for position control by phase control.

Further, to secure stable magnetization at room temperature, the temperature at which the magnetization of a magnetic layer is erased is preferably high. Further, the magnetic domains of a magnetic pattern can clearly be formed when the difference between the room temperature and the magnetization erasure temperature is large. Accordingly, the magnetization erasure temperature is preferably at least 100° C. The magnetization erasure temperature may, for example, be in the vicinity of the Curie temperature (slightly lower than the Curie temperature) or in the vicinity of the compensatory temperature.

Further, to prevent damage of the medium due to impact with the magnetic head or sliding of the contact head during recording and reproducing, it is preferred to provide a protective layer on the magnetic layer. The thickness is preferably at most 50 nm to shorten the distance between the magnetic layer and the head during recording and reproducing. In a case where the recording medium has a plurality of magnetic layers, a protective layer may be provided on the magnetic layer which is closest to the surface. When the protective layer is made of diamond-like carbon, the magnetic layer will hardly be damaged by the head.

Further, it is preferred to provide a lubricant layer on the protective layer to impart lubricity between the medium and the head. The lubricant layer is preferably thin so as not to inhibit formation of the magnetic pattern, and is preferably at most 10 nm.

Further, in order not to inhibit the running stability of the flying/contact head, the surface roughness Ra of the medium is preferably at most 3 nm. Here, the medium surface roughness Ra is roughness of the surface of the medium not including the lubricant layer, and is a value obtained by measuring the roughness by means of a feeler type surface roughness meter at a measurement length of 400 μm, and calculating the measured value in accordance with JIS B0601. It is more preferably at most 1.5 nm.

According to a fourth aspect of the present invention, there is provided a method for producing the above magnetic recording medium, which comprises a step of locally heating the magnetic layer on the medium, and a step of applying an external magnetic field to the magnetic layer of the medium to form a magnetic pattern for control.

According to the fourth aspect of the present invention, a magnetic pattern for control with a high quality of reproducing signals can efficiently be formed with a high precision, on a longitudinal hard disk on which recording and reproducing is carried out by a magnetic head and which has a high coercive force of at least 3,000 Oe. Namely, a pattern which has a small magnetic transition width, which has an extremely steep magnetic transition at the boundary of magnetic domains, which has a small full width at half maximum of an isolated pulse of the reproducing signal, and which has a high quality, can be formed.

Particularly, by applying an external magnetic field to preliminarily magnetize the magnetic layer homogeneously in a desired direction, and simultaneously with locally heating the magnetic layer of the medium, applying an external magnetic field to magnetize the heated area in the direction opposite to said desired direction to form a magnetic pattern for control, a desired saturation recording can be carried out, whereby a magnetic pattern having a large output of the reproducing signals can be obtained.

Further, according to the mode of applying an external magnetic field simultaneously with the local heating to magnetize the heated area, the coercive force of a magnetic recording medium having a high coercive force, which can hardly be magnetized by a conventional magnetic printing method, can adequately be lowered by heating to magnetize the medium, whereby such a medium can easily be magnetized with a weak magnetic field.

Here, the desired magnetization direction is the same or opposite direction to the running direction of the data writing/reproducing head (relative movement direction of the medium and the head) in a case where the easy axis is in a plane direction, or is a direction perpendicular thereto in a case where the easy axis is perpendicular to the plane direction.

Further, to preliminarily magnetize the magnetic layer homogeneously in a desired direction by applying an external magnetic field, is usually to homogeneously magnetize the entire magnetic layer, however, a part of the magnetic thin layer may be magnetized so long as the region on which the magnetic pattern is formed is homogeneously magnetized.

The present method is effective when applied to formation of a servo pattern to be used for position control of the data recording/reproducing magnetic head, which is simple and to which a severe precision is required, or formation of a standard pattern for recording said servo pattern. Since a high precision servo pattern or standard pattern can be obtained, the present method is effective when applied to a high density medium such as one having a track density of at least 40 kTPI.

Further, according to the present method, a magnetic pattern including a pattern which is present in an inclined direction to the running direction of the magnetic head, which has conventionally been difficult to form, can easily be formed. Further, the magnetic pattern having a high signal intensity can be obtained. The present method is particularly suitable for an inclined pattern of e.g. phase servo signals.

To form a more precise magnetic pattern, as the means of heating, it is preferred to employ energy beam in view of easiness of power control and control of the size of the area to be heated. It is preferred to employ pulse-like energy beam to control the area to be heated and to control the heating temperature. The energy beam may be one capable of partially heating the surface of the recording layer, and preferred is laser since irradiation of energy beam on an unnecessary area can be prevented.

The continuous laser beam may be formed into pulses by an optical component, but particularly preferred is use of a pulse laser light source. The pulse laser light source intermittently oscillates laser beam pulse-wise, and with which irradiation of laser beam having a high peak power can be carried out in an extremely short period of time, whereby heat is hardly be accumulated.

Further, when the magnetic layer is irradiated with energy beam by means of a mask to form a magnetic pattern on the magnetic recording medium, not only the precision of the magnetic pattern tends to be high, but also a pattern having a free shape can easily be formed in a short period of time. The mask may be one which forms gradation of energy beam on the surface of the medium corresponding to the magnetic pattern to be formed when irradiated with energy beam.

According to a fifth aspect of the present invention, there is provided a magnetic recording apparatus which comprises a magnetic recording medium, a driving component which drives the magnetic recording medium in a recording direction, a magnetic head comprising a recording component and a reproducing component, a means of moving the magnetic head relatively to the magnetic recording medium, and a recording/reproducing signal processing means which inputs a recording signal to the magnetic head and outputs a reproducing signal from the magnetic head, wherein the magnetic recording medium is any magnetic recording medium as described above. With such a magnetic recording apparatus, a high density recording can be carried out at a low cost.

As the magnetic head, usually a flying/contact magnetic head is used so as to carry out a high density recording.

Further, it is possible to easily obtain a precise servo signal by a magnetic recording apparatus wherein a magnetic recording medium is incorporated in the apparatus, then the magnetic pattern for control is reproduced by the magnetic head to obtain a signal, and a servo burst signal is recorded by the magnetic head employing the above signal as a standard. In such a case, if a signal recorded as a magnetic pattern by the present invention remains on a region which is not used as the user data region, after the servo burst signal is recorded by the magnetic head, even if the position of the magnetic head is shifted from the original position due to a certain disturbance, the magnetic head can easily be returned to the desired position, and accordingly a magnetic recording apparatus wherein signals by both writing methods are present has a high reliability.

Now, the present invention will be described in further detail with reference to the preferred embodiments.

In the accompanying drawings:

FIGS. 1(a), 1(b), 1(c) and 1(d) illustrate reproducing signal waveforms in Example 1 of the present invention.

FIG. 5 is a schematic cross-sectional view illustrating a magnetic pattern forming apparatus used in Examples of the present invention.

Figure 1B:
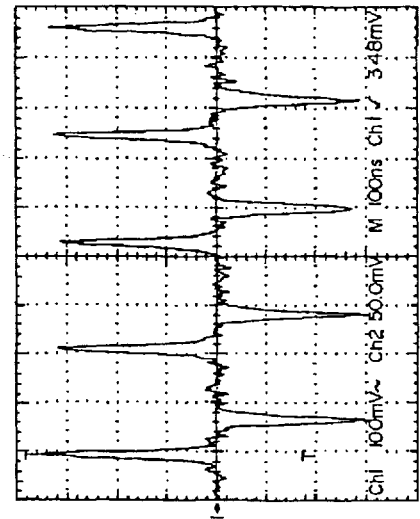

The present invention relates to a magnetic recording medium on which a magnetic pattern for information is formed by a magnetic head to record information, such as a hard disk. As mentioned above, when the space between information recording tracks is decreased to increase the number of tracks, it is necessary to further increase the precision of the position control of the data recording/reproducing head, and accordingly a servo pattern which generates position control signals (hereinafter sometimes referred to as servo signals) has to have a high precision, and the reproducing output thereof has to be high.

Further, it is strongly desired to decrease the region other than the region to be used for data recording i.e. the region to be used for the servo signals and gaps between the servo region and the data recording region, to enlarge the data recording region and to increase the data recording capacity. Accordingly, it is necessary to increase output of the servo signals and to increase precision of the synchronous signals.

As mentioned above, with a conventional magnetic printing method, a magnetic pattern can be printed on a longitudinal recording medium having a relatively low coercive force, however, it tends to be difficult to form a magnetic pattern with a high precision on a perpendicular recording medium or on a longitudinal recording medium having a high coercive force of at least 3,000 Oe.

According to the present invention, by forming a magnetic pattern for control having a narrow magnetic transition region on such a medium, the full width at half maximum of an isolated pulse of the reproducing signal of the magnetic pattern for control is made to be smaller than the full width at half maximum of an isolated pulse of the reproducing signal of the magnetic pattern for information. Accordingly, the synchronous precision and the position precision of the magnetic head can be increased, whereby a high density recording medium having a high reliability can be provided. The present invention is more effective when applied to a medium having a high coercive force.

With a conventional magnetic printing technique, a stronger magnetic field is required for magnetic printing if the coercive force of the magnetic disk to be printed is large, and accordingly, the higher the coercive force, the more difficult it is to carry out the magnetic printing. In such a case, insufficient magnetic printing state first appears in the magnetic transition region, and the magnetic transition region becomes unclear, the full width at half maximum broadens, and the full width at half maximum will be broader than that of writing by the magnetic head. Accordingly, it is particularly desirable to form a magnetic pattern having a narrow full width at half maximum by means of a method as mentioned hereinafter on a longitudinal recording medium having a coercive force of at least 3,000 Oe, more preferably at least 3,300 Oe, in view of high density. Otherwise, it is particularly preferred to form a magnetic pattern having a narrow full width at half maximum by means of a method as described hereinafter on a perpendicular recording medium or a medium having a coercive force of preferably at least 2,000 Oe, more preferably at least 2,500 Oe, in view of high density.

By forming a magnetic pattern for control by magnetic domains having a narrow magnetic transition width, the isolated pulse of the reproducing signal will be sharp, the fill width at half maximum will be narrow, and the position precision of the signal detection will be high, and accordingly the precision when the position of the magnetic head on a data track is determined will be increased. Further, the detection precision of the synchronous signal will also be high, and accordingly a clock which records/reproduces data can be obtained more precisely.

Here, it is preferred that an adequate saturation recording is carried out, whereby the output of the producing signal will be high and the full width at half maximum will be narrower. If the reproducing signal is high, an adequate accumulated value can be obtained even with a narrow servo region, whereby the servo region can be narrowed, and the user data area can be increased correspondingly, whereby the data recording capacity can be increased.

A gap is provided to a certain extent between e.g. the servo signal or address signal area and the user data area. If the synchronous precision is not high, the clock will be inaccurate, and the dispersion between the initial point and the terminal point of the data recording tends to be significant, and accordingly a gap to absorb the dispersion has to be large.

According to the present invention, the gap can be narrowed since the synchronous precision is high, and accordingly the user data area can be enlarged correspondingly, and the data recording capacity can be increased.

The full width at half maximum of an isolated pulse of the reproducing signal of the magnetic pattern for control is preferably at most 95%, more preferably at most 90%, of the fill width at half maximum of an isolated pulse of the reproducing signal of the magnetic pattern for information.

Here, the magnetic pattern for information, which is the standard of comparison, is a magnetic pattern in a case where a saturation recording is carried out at room temperature by using a magnetic head which is usually used for recording/reproducing on the magnetic recording medium. When the medium is incorporated in the magnetic recording apparatus together with the magnetic head, it is a magnetic pattern when recording is carried out by the magnetic head. Further, the room temperature is at a level of 25° C.

In the present invention, as the recording layer (magnetic layer), a longitudinal magnetic recording layer having a coercive force of at least 3,000 Oe at room temperature is used. With respect to the coercive force of the magnetic layer at room temperature, the magnetic layer has to maintain magnetization at room temperature and has to be homogeneously magnetized by a proper external magnetic field. Accordingly, for a magnetic layer of the high density recording medium on which minute magnetic domains are formed, a high coercive force of at least 3,000 Oe is necessary, and the coercive force is preferably at least 3,300 Oe.

Otherwise, as the recording layer, a perpendicular magnetic recording layer having a high possibility of high density recording is used. The coercive force at room temperature is preferably high so as to maintain minute magnetic domains to carry out high density recording. It is preferably at least 2,000 Oe, more preferably at least 2,500 Oe.

With a conventional magnetic printing method, printing tends to be difficult on a medium having a very high coercive force. Whereas, the present invention wherein a magnetic layer is heated to adequately lower the coercive force to form a magnetic pattern, is applied preferably to a medium having a large coercive force.

However, the coercive force is preferably at most 20 kOe. If it exceeds 20 kOe, a strong external magnetic field is required for batch magnetization, and there is a possibility that a usual magnetic recording may be difficult.

The present invention is applied particularly preferably to a case of including a magnetic pattern for position control (phase servo) by phase control.

For example, in the phase servo system, a magnetic pattern which linearly extends slantly relative to the radius from the inner circle to the outer periphery is employed. The phase servo system is an excellent system wherein the position can be determined with a high precision if the pattern can be formed precisely, but it has conventionally been difficult to form such a pattern which is continuous in the radius direction or an inclined pattern. Even if they can be formed, with an inclined pattern, the reproducing signal tends to be small, the full width at half maximum of an isolated pulse tends to be large, and the detection precision tends to be inadequate.

According to a method of forming the magnetic pattern for control of the present invention as described hereinafter, an excellent magnetic pattern with a high reproducing signal and a small full width at half maximum of an isolated pulse can be formed even if it is an inclined pattern, and the head position control with a high precision of the phase servo system itself becomes possible.

Now, preferred method of forming the magnetic pattern for control of the present invention will be explained below.

In the present invention, a step of locally heating the magnetic recording medium and a step of applying an external magnetic field are combined to form the magnetic pattern for control, whereby a magnetic pattern for control having a high quality of reproducing signal and a high precision can easily be formed in a short period of time.

According to this method, a magnetic pattern for control having a high quality of the reproducing signal can efficiently be formed with a high precision. Namely, a pattern having a small magnetic transition width, a very steep magnetic transition at the boundary of magnetic domains and having a high quality of the reproducing signal can be formed.

As a method of forming a servo signal, a magnetic printing method has conventionally been known, but it tends to be difficult to apply the method to a medium having a high coercive force or to a perpendicular recording medium, and this method is likely to cause flaws on the medium.

Further, with the magnetic printing method, it tends to be difficult to carry out saturation recording on a magnetic recording medium having a high saturation magnetization, and the output or the full width at half maximum tends to be inadequate. There is a significant problem with formation of an inclined pattern for phase servo as mentioned hereinafter.

The method of the present invention is a method to efficiently form a magnetic pattern for control with a high precision, to overcome the above problems, and will be explained below (hereinafter the magnetic pattern for control may sometimes be referred to simply as a magnetic pattern).

In the present invention, as a combination of a step of locally heating the magnetic layer and a step of applying an external magnetic field to the magnetic layer, the following four modes may be applicable.

Mode 1: A method of forming a magnetic pattern by homogeneously magnetizing the magnetic layer in a desired direction by a strong external magnetic field before heating, and then heating a desired area to a magnetization erasure temperature, e.g. in the vicinity of the Curie temperature, for erasing, whereby a magnetic pattern with a small magnetic transition width and a small full width at half maximum of an isolated pulse can be formed most easily. Further, since the magnetic layer is homogeneously magnetized, a conventional magnetic recording can be carried out after the magnetic pattern is formed by the present method.

Mode 2: A method of forming a magnetic pattern by homogeneously magnetizing the magnetic layer in a desired direction by a strong external magnetic field before heating, and then heating a desired area to a magnetization erasure temperature, e.g. in the vicinity of the Curie temperature, and at the same, applying a weak magnetic field in a direction different from the homogeneous magnetization direction for erasing, whereby a magnetic pattern with a small magnetization transition width and a small full width at half maximum of an isolated pulse can be formed. Further, the erasing can completely be carried out, whereby a magnetic pattern having a strong signal intensity can be obtained.

Mode 3: A method of forming a magnetic pattern by applying a weak external magnetic field simultaneously with heating to magnetize the heated area alone in a direction of the external magnetic field, whereby a magnetic pattern with a small magnetization transition width and a small full width at half maximum can be formed most easily, and further, a weak external magnetic field is sufficient.

Mode 4: A method of forming a magnetic pattern by homogeneously magnetizing the magnetic layer in a desired direction by a strong external magnetic field before heating, then heating a desired area, and at the same time, applying a weak magnetic field in a direction opposite to that before heating, whereby a magnetic pattern with a small full width at half maximum of an isolated pulse and a maximum reproducing signal intensity (output) can be formed, and a magnetic pattern having good C/N and S/N can be obtained. Namely, such a pattern that the magnetic transition width is small, the magnetic transition at the boundary of magnetic domains is very steep, PW50 is small, the output is high since magnetic domains are saturation recorded in a direction opposite to each other, and the quality of the reproducing signal is high, can be formed. When conditions are met, the magnetic transition width may be at most 1 $\mu$m, further, at most 0.5 $\mu$m or at most 0.3 $\mu$m.

Now, the above modes will be explained. Now, Mode 1 will be explained below.

A strong external magnetic field is applied to a magnetic disk to magnetize the entire magnetic layer homogeneously in a desired magnetization direction. As a means of applying the external magnetic field, a magnetic head may be used, or a plurality of electromagnetics or permanent magnetics may be arranged so that a magnetic field is formed in a desired magnetization direction, or the above means may be combined.

Here, the desired magnetization direction is the same or opposite direction to the running direction of the data recording/reproducing head (relative movement direction of the medium and the head) in a case where the easy axis is in a plane direction, or it is one of the perpendicular directions (upward or downward) in the case where the easy axis is perpendicular to the plane direction. Accordingly, the external magnetic field is applied so that the magnetic layer is magnetized in the above direction.

Further, to magnetize the entire magnetic layer homogeneously in a desired direction is to magnetize the entire magnetic layer in a substantially same direction, but not entire magnetic direction has to be magnetized strictly, and at least a region on which a magnetic pattern has to be formed should be magnetized in the same direction.

The intensity of the magnetic field varies depending upon the properties of the magnetic layer of the magnetic recording medium, and it is preferred to magnetize the magnetic layer with a magnetic field at least twice the coercive force of the magnetic layer at room temperature. If it is weaker than that, there is a possibility that the magnetization may be inadequate. However, it is usually at a level of at most five times the coercive force of the magnetic layer at room temperature in view of power of a magnetizing apparatus to be used for applying a magnetic field.

Then, the surface of the magnetic layer of the magnetic disk is partially heated to the magnetization erasure temperature of the magnetic layer, e.g. in the vicinity of the Curie temperature, for erasing. Otherwise, the magnetization may not completely be erased, and the heated area may be magnetized weakly than the homogeneously magnetized region in said desired magnetization direction.

In Mode 2, the direction and the intensity of the external magnetic field before heating are the same as in Mode 1.

The direction of the magnetic field to be applied simultaneously with heating is a direction perpendicular to the plane in a case where the easy axis is in a plane direction, and it is in the plane direction of the medium in a case where the easy axis is perpendicular to the plane direction. A magnetic field is applied in such a direction to erase the magnetization.

The higher the intensity of the magnetic field, the easier to form a magnetic pattern, but it is weaker than the coercive force of the magnetic layer at room temperature, although it varies depending upon the properties of the magnetic layer of the magnetic recording medium. It is preferably at least one eighth of the coercive force of the magnetic layer at room temperature. If it is weaker than that, there is a possibility that the heated area may be magnetized in the same direction as that of the surroundings again due to influence of the magnetic field from the surrounding magnetic domains during cooling.

However, it is preferably at most two thirds, more preferably at most half, the coercive force of the magnetic layer at room temperature. If it is larger than this, magnetic domains surrounding the heated area may also be influenced.

As the heating, the magnetic layer may be heated to a temperature at which decrease in the coercive force of the magnetic layer is confirmed, and it is heated to the magnetization erasure temperature of the magnetic layer, or in the vicinity of the Curie temperature, for example. It is heated to preferably at least 100° C. A magnetic layer which is influenced by the external magnetic field at a temperature less than 100° C. tends to have a low stability of magnetic domains at room temperature. Further, the heating temperature is preferably at most 700° C. If the heating temperature is too high, there is a possibility that the magnetic layer may undergo deformation.

The direction of the external magnetic field applied simultaneously with the heating in Mode 3 varies depending upon the type of the magnetic layer of the magnetic recording medium. In a case where the easy axis is in the plane direction, the external magnetic field is applied so that the magnetic layer is magnetized in the same or opposite direction to the running direction of the data recording/reproducing head (relative movement direction of the medium and the head). In the case where the easy axis is perpendicular to the plane direction, it is applied so that the magnetic layer is magnetized in one of perpendicular directions.

The intensity of the magnetic field is the same as the intensity of the external magnetic field applied simultaneously with the heating in Mode 2. Further, the heating temperature is also the same as in Mode 2.

In Mode 4, the direction and intensity of the external magnetic field before heating are the same as in Mode 1.

The intensity of the magnetic field applied simultaneously with the heating is the same as in Mode 2, but the direction is opposite to the direction of the magnetic field before heating, and the magnetic layer is magnetized locally oppositely. The heating temperature is the same as in Mode 2.

In the present invention, it is preferred to form a magnetic pattern by applying an external magnetic field to preliminarily magnetize the magnetic layer homogeneously in a desired direction, and then locally heating the magnetic layer, and at the same time, applying an external magnetic field to magnetize the heated area in a direction opposite to said desired direction as in Mode 4, whereby magnetic domains which are opposite to each other can clearly be formed, and accordingly a magnetic pattern which has a strong signal intensity and good C/N and S/N can be obtained.

Otherwise, according to Mode 1, a magnetic recording medium wherein the magnetic layer has, in a region which is magnetized homogeneously in a desired direction, a pattern having no magnetization partially or a pattern which is weakly magnetized in said desired direction partially, can be obtained. This medium can easily be prepared in a very short period of time only by homogeneously magnetizing the entire medium in the block, followed by mask exposure for erasing.

Now, an explanation will be made with reference to an example wherein a magnetic pattern for control is formed on a magnetic disk which is representative of a magnetic recording medium in accordance with Mode 1.

A strong external magnetic field is applied to a magnetic disk to magnetize the entire magnetic layer homogeneously in a desired magnetization direction. As a means of applying the external magnetic field, a magnetic head may be used, or a plurality of electromagnetics or permanent magnetics may be arranged so that a magnetic field is formed in a desired magnetization direction, or the above means may be combined.

Here, the desired magnetization direction is the same or opposite direction to the running direction of the data recording/reproducing head (relative movement direction of the medium and the head) in a case where the easy axis is in a plane direction, or it is one of the perpendicular directions in the case where the easy axis is perpendicular to the plane direction.

Then, the surface of this magnetic layer of the magnetic disk is partially heated to the magnetization erasure temperature of the magnetic layer, e.g. in the vicinity of the Curie temperature, for erasing. Otherwise, the magnetization may not completely be erased, and the heated area may be magnetized weakly than the homogeneously magnetized region in said desired magnetization direction.

Now, the method of heating the magnetic layer locally in the present invention will be explained below.

The heating means may be one having a function to partially heat the surface of the magnetic layer, and preferred is one utilizing energy beam such as laser with which power control and size control of the area to be heated can easily be carried out, in view of prevention of heat diffusion to an unnecessary area and control property.

Here, it is preferred to use a mask together. When the magnetic layer is irradiated with energy beam by means of a mask, a plurality of magnetic patterns can be formed at once, whereby a step of forming the magnetic pattern can be carried out in a short period of time.

The mask may be one which forms gradation of energy beam on the surface of the magnetic disk corresponding to the magnetic pattern to be formed. A photomask having a transmission portion transmitting energy beam corresponding to the pattern, a hologram mask on which hologram imaging a specific pattern on the medium is recorded, or an imaging optical system may, for example, be mentioned. By using such a mask, a plurality of magnetic patterns can be formed at once, whereby the magnetic pattern forming step can be carried out easily in a short period of time.

Further, it is preferred to use energy beam as pulses rather than continuous irradiation to control the area to be heated or to control the heating temperature.

Particularly preferred is use of a pulse laser light source. The pulse laser light source intermittently oscillates laser beam as pulses, and with which irradiation with a laser beam having a high peak power can be carried out in an extremely short period of time as compared with a continuous laser beam which is intermitted and made into pulses by an optical component such as an acoustooptic element (AO) or an electrooptic element (EO), and heat is less likely to be accumulated, such being extremely preferred.

In a case where a continuous laser beam is made into pulses by an optical component, the power is substantially the same in the entire pulse width in the pulse. On the other hand, a pulse laser light source accumulate energy by resonance in the light source for example, and discharges laser beam as a pulse at once, whereby the peak power in a pulse is extremely high, and then the power decreases. In the present invention, in order to form a magnetic pattern having a high contrast and a high precision, it is preferred to suddenly heat the magnetic layer in an extremely short period of time and then quenching it, and accordingly use of a pulse laser light source is suitable.

With respect to the surface of the medium on which the magnetic pattern is formed, the difference in temperature is preferably significant as between during irradiation of the pulse energy beam and not, in order to increase the contrast of the pattern or to increase the recording density. Accordingly, when the medium is not irradiated with the pulse energy beam, the temperature is preferably at most at a level of room temperature. The room temperature is at a level of 25° C.

Here, when the pulse energy beam is used, the external magnetic field may be applied continuously or may be applied as pulses.

The wavelength of the energy beam is preferably at most 1,100 nm. When the wavelength is shorter than this, the diffraction effect tends to be small and the resolution tends to increase, whereby a fine magnetic pattern is likely to be formed. It is more preferably at most 600 nm, whereby not only high resolution can be obtained, but the diffraction is small, and accordingly spacing between the mask and the magnetic recording medium due to space tends to be wide, handling tends to be easy, and it tends to be easy to constitute a magnetic pattern forming apparatus. Further, the wavelength is preferably at least 150 nm. If it is less than 150 nm, absorption of synthetic quartz to be used for the mask tends to be high, and heating tends to be inadequate. When the wavelength is at least 350 nm, optical glass may be used as a mask.

Specifically, excimer laser (157, 193, 248, 308, 351 nm), double wave (532 nm), triple wave (355 nm) or quadruple wave (266 nm) of Q switch laser (1,064 nm) of YAG, Ar laser (488 nm, 514 nm) or ruby laser (694 nm) may, for example, be mentioned.

With respect to the power of the energy beam, an optimum value may be selected depending upon the intensity of the external magnetic field, but the power of the pulse energy beam per pulse is preferably at most 1,000 $mJ/cm^2$. If a power stronger than this is applied, the surface of the magnetic recording medium may be damaged by the pulse energy beam and the medium may undergo deformation. When the roughness Ra becomes at least 3 nm or the swell Wa becomes at least 5 nm due to deformation, running of the flying/contact head may be impaired.

It is more preferably at most 500 $mJ/cm^2$, furthermore preferably at most 200 $mJ/cm^2$. Within such a range, a magnetic pattern having a high resolution tends to easily be formed even if a substrate having a relatively large heat diffusion is used. Further, the power is preferably at least 10 $mJ/cm^2$. If the power is smaller than this, the temperature of the magnetic layer is less likely to increase, whereby the magnetic printing can hardly be carried out. Further, the influence of diffraction of the energy beam varies depending upon the pattern width, and accordingly the optimum power also varies depending upon the pattern width. Further, the shorter the wavelength of the energy beam, the more the upper limit of the power to be applied tends to decrease.

In a case where the substrate to be used in the present invention is made of a metal such as Al or an alloy, the heat conductivity tends to be high. Accordingly, the above power is preferably within a range of from 30 to 180 $mJ/cm^2$ so that the heat applied locally does not spread to an area other than the desired area and the magnetic pattern is not distorted, and that the substrate is not physically damaged due to an excess energy.

In a case where the substrate is made of a ceramic such as glass, the heat conductivity is low as compared with e.g. Al, and heat tends to be accumulated at an area irradiated with the pulse energy beam, and accordingly the power is preferably from 10 to 150 $mJ/cm^2$.

In a case where the substrate is made of a resin such as polycarbonate, heat tends to be accumulated at an area irradiated with the pulse energy beam, and the melting point tends to be low as compared with e.g. glass, and accordingly the power is preferably within a range of from 10 to 120 $mJ/cm^2$.

Further, in a case where damage of the magnetic layer, the protective layer and the lubricant layer due to the energy beam is worried, the power of the pulse energy beam may be decreased and the intensity of the magnetic field applied simultaneously with application of the pulse energy beam may be increased. For example, a magnetic field as strong as possible within a range of from 25 to 75% of the coercive force of the magnetic recording medium at room temperature is applied to decrease the irradiation energy.

Here, when irradiation with the pulse energy beam by means of the protective layer and the lubricant layer is carried out, it may be necessary to coat a lubricant again after irradiation in some cases, taking e.g. damage (decomposition, polymerization) of the lubricant into consideration.

The pulse width of the pulse energy beam is preferably at most 1 $\mu$sec. If the pulse width is longer than this, heat generation due to energy applied by the pulse energy beam on the magnetic recording medium tends to be dispersed, and the resolution tends to decrease. If the powers per pulse are the same, the heat dispersion tends to be small and the resolution of the magnetic pattern tends to be high when the medium is irradiated with an intense energy at once with a short pulse width. It is more preferably at most 100 nsec. Within the above range, a magnetic pattern having a high resolution tends to easily be formed even if a substrate having a relatively high heat dispersion, made of a metal such as Al, is used. To form a pattern having a minimum width of at most 2 µm, the pulse width is preferably at most 25 nsec. Namely, when the resolution is emphasized, the pulse width is preferably as short as possible. Further, the pulse width is preferably at least 1 nsec, because it is preferred to keep the magnetic layer heated until the flux reversal is completed.

Here, as one type of the pulse laser, laser capable of generating ultrashort pulses at a picosecond or femtosecond level at a high frequency, such as mode lock laser, may be mentioned. During irradiation with ultrashort pulses at a high frequency, the magnetic layer is not irradiated with the laser beam, in an extremely short time between ultrashort pulses, however, said time is extremely short, and accordingly the heated area does not substantially cooled. Namely, an area which is once heated to at least the Curie temperature is kept to be at least the Curie temperature.

Accordingly, in such a case the continuous irradiation period (continuous irradiation period including the time when the magnetic layer is not irradiated with the laser beam between ultrashort pulses) is taken as one pulse. Further, the integrated value of the irradiation energy amount during the continuous irradiation period is taken as a power per pulse ($mJ/cm^2$).

Preferably, homogenization treatment of the intensity distribution is preliminarily applied to the energy beam, whereby distribution of the heating state in the irradiated area can be decreased, and the distribution of the magnetic intensity of the magnetic pattern can be decreased. Accordingly, a magnetic pattern having a high homogeneity of the signal intensity can be formed when the signal intensity is read by using a magnetic head.

As the homogenization treatment of the intensity distribution, the following treatments may be mentioned. Namely, the intensity distribution is homogenized by using a homogenizer or a condenser lens, or the energy beam having a small intensity distribution alone is transmitted by means of a shading plate or a slit and the energy beam may be amplified as the case requires.

It is preferred to subject the energy beam to optical resolution once and then to get the resolved beams together to carry out a homogenization treatment, whereby the energy beam can be used without waste and the efficiency is high. In the present invention, for heating the magnetic layer, it is preferred to irradiate the magnetic layer with a high intensity energy beam in a short period of time, and accordingly it is preferred to use the energy without waste.

In the present invention, preferably the magnetic layer is irradiated with the energy beam by means of a mask for local heating. If a mask is formed once, a magnetic pattern having any shape can be formed on the medium, and accordingly a complicated pattern or a special pattern which has been difficult to form by a conventional method can easily be formed.

For example, in a phase servo system of a magnetic disk, a linear magnetic pattern inclined relative to the radius and the track from the inner circle toward the outer periphery may be used. Such a pattern which is continuous in the radius direction or a pattern inclined relative to the radius has been difficult to form by a conventional servo pattern forming method of recording a servo signal per every track while rotating the disk. According to the present invention, such a magnetic pattern can easily be formed in a short period of time by one irradiation without complicated calculation or complicated apparatus constitution.

The mask does not has to cover the entire magnetic disk, and it may have a size covering a repeating unit of the magnetic pattern, and it may be moved for use. Accordingly, the mask can also be prepared easily at a low cost.

The mask may be one which forms gradation intensity distribution of energy beam on the surface of the magnetic disk by changing the intensity distribution of the energy beam correspondingly to the magnetic pattern to be formed. A photomask having a transmission portion transmitting energy beam corresponding to the pattern, or a hologram mask on which hologram imaging a specific pattern on the medium is recorded, may, for example, be mentioned. By using such a mask, a plurality of magnetic patterns or a magnetic pattern having a large area can be formed at once, whereby the magnetic pattern forming step can be carried out easily in a short period of time. It is preferred to use a hologram mask since a sharp and clear pattern can easily be formed even if the distance between the mask and the medium is adequately long, and the photomask is preferred since it can easily be prepared at a low cost.

The material of the mask is not particularly limited, however, when the mask is constituted by a non-magnetic material in the present invention, a homogeneously clear magnetic pattern can be formed regardless of the pattern shape, and a homogeneous and intense reproducing signal can be obtained.

In a case where a mask containing a ferromagnetic material is used, the magnetic field distribution is disturbed due to magnetization, such being unfavorable. From the properties of the ferromagnetic material, in a case of an inclined pattern shape relative to the radius direction of the magnetic disk or an arc pattern extended the radius direction, the magnetic domains do not adequately compete with each other at the magnetic transition portion, whereby no high quality signal tends to be obtained.

The mask is disposed between the light source of the energy beam and the magnetic layer (magnetic recording medium). When importance is attached to the precision of the magnetic pattern, it is preferred that the entire or a part of the mask is brought into contact with the medium, whereby influence of the diffraction of the laser beam can be minimized, and a magnetic pattern having a high resolution can be formed. When the mask is left to stand on the medium for example, due to swell at a level of several nm on the surface of the medium, there are a portion which is in contact with the medium and a portion which is not. However, the pressure applied to the mask and the medium is at most 100 $g/cm^2$ so that no indentations are formed on the medium or the medium is not damaged.

However, it is preferred to provide a space between the mask and the medium at least in the region on which a magnetic pattern is formed on the medium, so as to minimize the flaws or scars, whereby damages or flaws of the mask or the medium due to inclusion of e.g. dusts can be suppressed.

Further, particularly in a case where a lubricant layer is provided before formation of the magnetic pattern, it is preferred to provide a space between the mask and the medium so as to minimize attachment of the lubricant to the mask.

A method of maintaining the space between the mask and the magnetic recording medium at the region on which the magnetic pattern is formed, may be any method capable of maintaining them at a certain distance. For example, the mask and the medium may be held by a specific apparatus to maintain a certain distance. Otherwise, a spacer may be inserted between the two at an area other than the region on which the magnetic pattern is formed, or a spacer may be incorporated in the mask itself.

It is preferred to provide, between the mask and the magnetic recording medium, a spacer at the periphery portion and/or inner circle portion of the region on which the magnetic pattern is formed on the medium, whereby an effect to repair the swell on the surface of the magnetic recording medium may be generated, and the precision of the magnetic pattern formation tends to increase.

A mask having a plurality of transmission portions formed thereon corresponding to the magnetic pattern to be formed is prepared, and the magnetic layer is irradiated with the laser beam through the mask. When the magnetic layer is irradiated in the block to form magnetic patterns for plural tracks or plural sectors by using laser beam having a large diameter or an elliptic shape which is long in a lateral direction, the recording efficiency significantly increases, and the problem is overcome that the servo recording time increases along with increase in the capacity in the future.

The photomask may be any mask having a transmission portion corresponding to the desired magnetic pattern and a non-transmission portion, and the desired transmission portion and non-transmission portion can be formed by sputtering a metal such as Cr on a transparent base made of e.g. quartz glass or soda lime glass, and coating a photoresist thereon, followed by etching or the like. In such a case, the portion having a Cr layer formed on the base is the energy beam non-transmission portion and the portion of the base alone is the transmission portion.

It is preferred to impart non-reflective coating on the both sides or one side of the mask. The non-reflective coating on the side of the energy source decreases influence by the reflected wave over the optical component, and makes the energy applied to the disk homogeneous consequently, and whereby a stable magnetic pattern can be obtained. The non-reflective coating on the side close to the disk decreases interference fringe caused in a case where the disk and the mask are not parallel or in a case where the disk/mask plane is not perpendicular to the optical axis, whereby a stable magnetic pattern can be formed. It is preferred to make the reflective power at most 3%, particularly preferably at most 1%, by the non-reflective coating particularly on the side close to the disk. Further, the non-reflective coating may be imparted before formation of the layer of e.g. Cr, or may be imparted in the final step after the etching is carried out to form the pattern of the mask.

The mask thus formed usually has concaves and convexes, and the convex portions do not transmit the energy beam, and the convex portions are put in the vicinity of the medium or approximately contacted with the medium. Otherwise, after such a mask is formed, a material which is transparent to the energy beam is embedded in the concave portions to flatten the surface to be approximately contacted with the medium.

The material of the spacer is preferably a hard one. Further, it is preferably one which is not magnetized since an external magnetic field is employed for pattern formation. Preferred is a metal such as stainless or copper, or a resin such as polyimide. The height may be optional, but is usually from several $\mu$m to several hundreds $\mu$m.

When an external magnetic field is applied simultaneously with heating, it is preferred to apply the external magnetic field to the plurality of transmission portions on the mask at the same time.

The minimum space between the mask and the magnetic recording medium is preferably at least 0.1 $\mu$m, whereby damage or flaws of the mask or the magnetic recording medium due to inclusion of e.g. dusts can be suppressed. Namely, when the space is at least 0.1 $\mu$m, unexpected contact of the mask with the area on which the magnetic pattern is formed, due to the swell on the surface of the medium, can be prevented. Accordingly, such a problem can be avoided that the heat conductivity of the medium at the contact portion changes, and the magnetizability at said portion alone specifically changes, whereby no desired magnetic pattern can be formed. It is more preferably at least 0.2 $\mu$m. However, the space is preferably at most 1 mm, whereby the diffraction of the energy beam can be made small, and such a problem can be avoided that the magnetic pattern tends to be unclear.

For example, in a case where a pattern of 2×2 $\mu$m (a pattern alternately having transmission portions of 2 $\mu$m and non-transmission portions of 2 $\mu$m) formed on a photomask is printed on the medium by means of an excimer laser (248 nm), it is necessary to maintain the distance between the mask and the medium to at most at a level of from 25 to 45 $\mu$m. If the distance is larger than this, the pattern of light and shade of the laser beam tends to be unclear due to diffraction phenomenon. In a case of a pattern of 1×1 $\mu$m (a pattern alternately having transmission portions of 1 $\mu$m and non-transmission portions of 1 $\mu$m), the distance is at most at a level of from 10 to 15 $\mu$m.

In the case of using a photomask, the distance between the photomask and the medium is preferably as short as possible within the above range, since the magnetic pattern tends to be unclear due to wraparound of energy beam if a distance is longer. To overcome this problem to obtain a clearer pattern, a thin transmission portion which acts as a diffraction grating may be formed, or a means which acts as a half-wave plate may be provided, on the outside of the transmission portion of the mask, to counteract the wraparound light by interference.

On the other hand, in a case of using a hologram mask, the distance between the mask and the plane on which the pattern is imaged corresponding to the hologram is preliminarily determined, and accordingly the space between the mask and the medium is adjusted so as to achieve said distance. Here, the mask and the medium can be put close to each other by using a prism.

A magnetic layer may be formed on each side of the magnetic disk in some cases, and in such cases, the magnetic pattern formation of the present invention may be successively carried out on each side, or the magnetic pattern formation may be carried out on both sides at the same time by disposing a mask, an energy irradiation system and a means of applying external magnetic field on each side of the magnetic disk.

In a case where at least two magnetic layers are formed on one side and different patterns are formed on the magnetic layers respectively, each layer may be individually heated by focusing the energy beam for irradiation on each layer, to form an individual pattern.

To form a magnetic pattern, it is preferred to provide, between the light source of the energy beam and the mask or between the mask and the medium, a shading plate capable of partially shading the medium from the energy beam at a region which should not be irradiated with the energy beam, to prevent re-irradiation of the energy beam.

The shading plate may be one which transmits no energy beam having a wavelength to be employed, and which reflects or absorbs the energy beam. However, if it absorbs the energy beam, it tends to generate heat and may influence the magnetic pattern, and accordingly it is preferably one having a good heat conductivity and a high reflectivity. A metal plate of e.g. Cr, Al or Fe may, for example, be mentioned.

Further, reducing imaging technique may be employed in the optical system. A patterned energy beam having an intensity distribution corresponding to the magnetic pattern to be formed is reduced to form an image on the surface of the medium. By this technique, the precision of the magnetic pattern may not be limited due to the alignment precision or the patterning precision of the mask, and a finer magnetic pattern can be formed with a high precision, as compared with a case where the energy beam is narrowed down by an objective lens and then transmitted through a mask, i.e. a case of proximity exposure. Further, the mask and the medium are distant from each other, whereby the influence of dusts on the medium tends to be small. Hereinafter this technique may sometimes be referred to as reducing image technique (imaging optical system).

The energy beam emitted from a light source changes the intensity distribution via a mask, and is reduced to form an image on the surface of the medium by means of an imaging means such as an imaging lens. Here, the imaging lens may be referred to as a projection lens, and the reducing imaging may be referred to as reducing projection.

The mask may be one which forms shading (gradation) of the energy beam on the medium depending upon the magnetic pattern to be formed. For example, a photomask having energy beam transmission portions and non-transmission portions corresponding to the pattern formed thereon or a hologram mask on which hologram for imaging a specific pattern on the medium is recorded may, for example, be mentioned.

In the present technique, an imaging means is provided between the mask and the medium. Conventionally, when the medium is irradiated with the energy beam in such a state that the medium and the photomask are contacted with each other, the mask may absorb the energy beam and heated depending upon the material, and the temperature on the surface of the medium contacted with the mask is raised, whereby no clear magnetic pattern may be formed. However, these problems can be overcome according to the present invention.

Namely, with respect to the medium plane on which the magnetic pattern is formed, the difference in temperature as between during irradiation with the pulse energy beam and not is preferably significant, to increase the contrast of the pattern or to increase the recording density. Accordingly, the temperature of the medium plane is preferably at a level of at most room temperature when the medium is not irradiated with the pulse energy beam. The room temperature is at a level of 25° C.

Further, it is preferred that the energy beam is transmitted through a condenser lens before the mask, whereby the intensity distribution of the energy beam can be homogenized, and the energy beam can efficiently be collected on the imaging lens.

The reducing imaging technique can be applied to a magnetic pattern having any size or shape so long as the beam diameter of the energy beam and the external magnetic field intensity permit, but the effect is higher when the magnetic pattern is finer. When the minimum width of the magnetic pattern is at most 2 $\mu$m, the alignment of the medium and the mask tends to be particularly difficult, and accordingly the application effect of the present technique tends to be high. The minimum width is more preferably at most 1 $\mu$m. Here, the minimum width of the pattern of the present invention is the shortest length in a pattern. It is the short side in a case of a pattern of a tetragon, it is the diameter in a case of a circle, and it is the short diameter in a case of an ellipse.

There is no lower limit of the pattern to be formed, and a fine pattern at a level of the wavelength limitation of the energy beam can be formed theoretically. For example, it is at a level of hundred nm by e.g. an excimer laser.

Further, according to the present technique, a finer magnetic pattern can be formed by reducing imaging, whereby the effect is significant when this technique is applied to formation of the pattern for control to be used for control of the data recording/reproducing head.

According to the present technique, a high precision servo pattern or standard pattern can be obtained, and accordingly the present technique is effective when applied to a high density medium such as one having a track density of at least 40 kTPI.

Further, also in a case where a magnetic pattern which extends slantly relative to the running direction of the magnetic head is included, the signal intensity can be made strong according to the present invention, such being highly preferred.

This is because an adequate magnetic field can be applied to a desired region in a desired direction without disturbance of the magnetic field direction from the external magnetic field. A pattern having an oblique angle to the running direction can hardly be recorded by a magnetic head. Further, according to a magnetic printing method using a master carrier equipped with a ferromagnetic layer, as disclosed in JP-A-10-40544 (European Patent No. 915456), it is possible to carry out recording, but only a pattern having a weak signal intensity can be formed.

Namely, with respect to an inclined pattern, the direction of the magnetic field for flux reversal is perpendicular to the gap formed by the ferromagnetic layer of the master carrier, and no desired magnetization direction can be obtained. As a result, the flux reversal direction is not completely opposite to the initial magnetization direction, whereby no adequate flux reversal pattern can be formed, and no high signal intensity tends to be obtained.

The inclined pattern may, for example, be a pattern inclined relative to a standard line, where the standard line is a direction at right angles to the head running direction. The inclination $\theta$ from the standard line is preferably within ±45°, whereby an adequate signal as a servo signal can be obtained. Accordingly, the present invention is particularly suitable for an inclined pattern of e.g. the phase servo signal.

A magnetic pattern having a high reproducing signal and having a small full width at half maximum of the isolated pulse can be formed by optimizing the above conditions. Namely, a pattern having a small magnetic transition width, having an extremely steep magnetic transition at the boundary of magnetic domains and having a high quality of the reproducing signal can be formed. Under selected conditions, the magnetic transition width can be at most 1 $\mu$m, and further, it can be at most 0.5 $\mu$m or at most 0.3 $\mu$m.

Further, the method of the present invention is favorable also from the viewpoint that the laser beam intensity can be suppressed low, as compared with a conventional method of forming a concave/convex pattern by a laser beam, and the flying/contact head will not be unstable since there is no concave or convex.

Preferably, the surface roughness Ra of the medium is at most 3 nm, and the swell Wa is at most 5 nm.

Here, on the magnetic recording medium, a region to be used for flying and descending of the head is usually provided in the innermost circle or the outermost circle. For example, in a case of a magnetic disk of a CSS (contact start and stop) system has a CSS zone in addition to the user data recording portion. A magnetic disk of load/unload system wherein the head parks on ramp when the magnetic recording apparatus is stopped, has a landing zone of the head.

The CSS zone and the landing zone are not used for information recording itself, and usually no magnetic pattern for control has to be formed thereon. Accordingly, the magnetic pattern for controlling may not be formed.

In a case where the protective layer or the lubricant layer may be impaired due to irradiation with the energy beam, it is preferred not to irradiate the CSS zone or the landing zone. On the contrary, it is well-influenced by irradiation with the energy beam such that the binding of the lubricant becomes well, it is preferred to carry out irradiation. However, this is considered to vary depending upon the type or the thickness of the protective layer and the lubricant layer, the shape of the protrusions in the CSS zone and the like.

In the case where the above zone is not to be irradiated with energy beam, the above zone may be shielded from the energy beam by means of a shielding plate or the non-transmission portion of the mask, or the irradiation position of the energy beam may be adjusted so that the zone is not irradiated.

In a case where the zone is irradiated with the energy beam, the zone is irradiated through the transmission portion of the mask, or said zone may not be covered with the mask on purpose.

Now, the constitution of the magnetic recording medium of the present invention will be explained below.

The substrate of the magnetic recording medium of the present invention is required not to vibrate even when it is rotated at high speed during high speed recording and reproducing, and usually a hard substrate is used. The substrate thickness is usually preferably at least 0.3 mm to obtain an adequate rigidity so that the substrate does not vibrate. However, too thick substrate is unfavorable to make the magnetic recording apparatus thin, and accordingly it is preferably at most 3 mm. An Al alloy substrate consisting essentially of Al, such as Al—Mg alloy, a Mg alloy substrate consisting essentially of Mg, such as Mg—Zn alloy, a substrate made of a conventional soda glass, aluminosilicate type glass, amorphous glass, silicon, titanium, ceramic or resin, or a substrate made of the combination thereof, may, for example, be employed. Particularly preferred is an Al alloy substrate, a substrate made of glass such as an amorphous glass in view of strength, or a substrate made of a resin in view of cost.

The present invention is effective when applied to a medium having a hard substrate. With a conventional magnetic printing method, the contact of the medium having a hard substrate with the master disk tends to be inadequate, and accordingly scars or flaws are likely to form, or the boundary between the magnetic domains printed tends to be unclear, whereby the PW50 tends to be broad. However, in the present invention, the mask and the medium are not pressed, whereby a good pattern with a narrow PW50 can be formed even with a hard substrate. Accordingly, the present invention is particularly effective when applied to a medium having a substrate on which cracks are likely to be formed, such as a substrate made of glass.

In a step of producing the magnetic disk, usually the substrate is cleaned and dried first, and also in the present invention, it is preferred to clean and dry the substrate before formation of layers from a viewpoint of securing adhesion of the layers.

In production of the magnetic recording medium of the present invention, a metal layer of e.g. NiP or NiAl may be formed on the surface of the substrate.

In the case where a metal layer is formed, as the forming means, a method to be used for formation of thin film, such as electroless deposition, sputtering, vacuum deposition or CVD method, may be employed. In a case of a substrate made of an electrically conductive material, electrolytic deposition may be employed. The thickness of the metal layer is preferably at least 50 nm. However, it is preferably at most 20 $\mu$m taking productivity of the magnetic disk medium into consideration. It is more preferably at most 10 $\mu$m.

Further, the region on which the metal layer is formed is preferably the entire substrate surface, however, the metal layer may be formed on a part such as a region to which texturing is applied.

Further, concentric texturing may be applied to the surface of the substrate or to the surface of the substrate having a metal layer formed thereon. In the present invention, the concentric texturing is mechanical texturing using free abrasive grains and a texture tape, texturing utilizing the laser beam, or a combination thereof, to polish the substrate in a circular direction to form a large number of fine grooves on the substrate circular direction.

In general, the mechanical texturing is carried out to obtain longitudinal anisotropy of the magnetic layer. It is not necessary to apply the mechanical texturing in a case where a longitudinal isotropic magnetic layer is wanted.

Further, the texturing utilizing e.g. the laser beam is usually carried out to obtain good CSS (contact start and stop) properties. It is not necessary to apply the texturing in a case of the magnetic disk apparatus of load/unload system wherein the head parks on ramp when the apparatus is not operated.

As the free abrasive grains to be used for the mechanical texturing, preferred are diamond abrasive grains, particularly ones having their surface subjected to a graphite treatment. As the abrasive grains to be used for mechanical texturing, alumina abrasive grains are widely used also. However, diamond abrasive grains show excellent properties from a viewpoint of the longitudinal oriented medium such that the magnetic easy axis are orientate along the texturing grooves.

It is effective that the head flying height is as small as possible to realize a high density magnetic recording, and one of the properties of the substrate is an excellent surface smoothness, and accordingly the roughness Ra on the substrate surface is preferably at most 2 nm, more preferably at most 1 nm, particularly preferably at most 0.5 nm. Here, the substrate surface roughness Ra is a value obtained by measuring the roughness by means of a feeler type surface roughness meter with a measurement length of 400 $\mu$m, and calculating the measured value in accordance with JIS B0601. Here, as the pointer for measurement, one having a radius at the tip of about 0.2 $\mu$m may be used.

On the substrate, e.g. a base layer may be formed between the magnetic layer and the substrate. The base layer is formed with a purpose of making crystals fine and controlling the orientation of the crystal face, and preferred is one consisting essentially of Cr.

As a material of the base layer consisting essentially of Cr, in addition to pure Cr, e.g. an alloy having one or at least two elements selected from the group consisting of V, Ti, Mo, Zr, Hf, Ta, W, Ge, Nb, Si, Cu and B added to Cr, or chromium oxide may also be mentioned with a purpose of crystal matching with the recording layer.

Particularly preferred is pure Cr or an alloy having one or at least two elements selected from the group consisting of Ti, Mo, W, V, Ta, Si, Nb, Zr and Hf added to Cr. The optimum content of such second or third element varies depending upon each element, but usually it is preferably 1 to 50 atomic %, more preferably from 5 to 30 atomic %, furthermore preferably from 5 to 20 atomic %.

The thickness of the base layer is not particularly limited so long as it is adequate to obtain the anisotropy. It is preferably from 0.1 to 50 nm, more preferably from 0.3 to 30 nm, furthermore preferably from 0.5 to 10 nm. When the base layer consisting essentially of Cr is formed, the substrate may be heated or not.

On the base layer, a soft magnetic layer may be provided in some cases between the base layer and the recording layer. The soft magnetic layer is effective particularly for a keeper medium wherein the magnetic transition noise is low or a perpendicular recording medium wherein the magnetic domains are perpendicular to the plane of the medium.

The soft magnetic layer may be one having a relatively high magnetic permeability and having a small loss, and preferred is NiFe or an alloy having e.g. Mo added thereto as a third element. The optimum magnetic permeability significantly varies depending upon the properties of the recording layer or the head to be utilized for recording of data, but the maximum magnetic permeability is preferably at a level of from 10 to 1,000,000 (H/m) on the whole.

Otherwise, an intermediate layer may be provided on the base layer consisting essentially of Cr as a case requires. For example, it is preferred to provide a CoCr type intermediate layer since it tends to be easy to control the crystal orientation of the magnetic layer.

Then, a recording layer (magnetic layer) is formed, and between the recording layer and the soft magnetic layer, a layer made of the same material as the base layer or another non-magnetic layer may be inserted. When the recording layer is formed, the substrate may be heated or may not be heated.

As the recording layer, a Co alloy magnetic layer, a rare earth type magnetic layer represented by TbFeCo, or a multi-layer of a transition metal and a noble metal, represented by a multi-layer of Co and Pd, may, for example, be used preferably.

As the Co alloy magnetic layer, usually pure Co or a Co alloy magnetic material which is conventionally used as a magnetic material, such as CoNi, CoSm, CoCrTa, CoNiCr or CoCrPt may be used. One having an element such as Ni, Cr, Pt, Ta, W or B or a compound such as $SiO_2$ further added to such a Co alloy, may also be employed. For example, CoCrPtTa, CoCrPtB, CoNiPt or CoNiCrPtB may, for example, be mentioned. The thickness of the Co alloy magnetic layer is optional, but preferred is at least 5 nm, more preferably at least 10 nm. Further, it is preferably at most 50 nm, more preferably at most 30 nm. At least two layers of the present recording layers may be laminated by means of a proper non-magnetic intermediate layer or directly. Here, the compositions of the magnetic materials to be laminated may be the same or different.

As the rare earth type magnetic layer, one which is common as a magnetic material may be used, and TbFeCo, GdFeCo, DyFeCo or TbFe may, for example, be mentioned. Tb, Dy, Ho or the like may further be added to such a rare earth alloy. Ti, Al, or Pt may be added with a purpose of preventing deterioration due to oxidization. The thickness of the rare earth type magnetic layer is optional, but it is usually at a level of from 5 to 100 nm. Further, at least two layers of the present recording layers may be laminated by means of a proper non-magnetic intermediate layer or directly. Here, the compositions of the magnetic materials to be laminated may be the same or different. The rare earth type magnetic layer is particularly suitable for high density recording since it is an amorphous structure film and has a magnetization in a direction perpendicular to the plane of the media, and the method of the present invention to form a high density and high precision magnetic pattern can more effectively be applied.

Likewise, as the multi-layer of a transition metal and a noble metal, which is applicable to the perpendicular magnetic recording, one which is common as a magnetic material may be employed, and Co/Pd, Co/Pt, Fe/Pt, Fe/Au or Fe/Ag may, for example, be mentioned. The transition metal and the noble metal as materials for the multi-layer are not necessarily pure, and may be alloys consisting essentially of them respectively. The thickness of the multi-layer is optional but is usually at a level of from 5 to 1,000 nm. Further, it may be a multi-layer of at least three materials as the case requires.

In the present invention, the recording layer is preferably thin. If the recording layer is thick, heat tends to be transmitted poorly in the layer thickness direction when the recording layer is heated, and there is a fear that the recording layer may not be well magnetized. Accordingly, the thickness of the recording layer is preferably at most 200 nm. However, it is preferably at least 5 nm so as to maintain magnetization.

In the present invention, the magnetic layer as the recording layer maintains magnetization at room temperature, and its magnetization may be erased when heated, or it may be magnetized by applying an external magnetic field thereto simultaneously with heating.

The magnetic layer is required to be one which maintains magnetization at room temperature and which is magnetized by a weak external magnetic field at an appropriate heating temperature. Further, the magnetic domains of the magnetic pattern tend to be formed clearly when the difference between the room temperature and the magnetization erasure temperature is large. Accordingly, the magnetization erasure temperature is preferably high, and it is preferably at least 100° C., more preferably at least 150° C. The magnetization erasure temperature is in the vicinity of the Curie temperature (slightly lower than the Curie temperature) or in the vicinity of the compensatory temperature for example.

The Curie temperature is preferably at least 100° C. If it is less than 100° C., stability of the magnetic domains at room temperature tends to be low. It is preferably at least 150° C. Further, it is preferably at most 700° C., since there is a possibility that the magnetic layer may undergo deformation when heated at a too high temperature.

In a case where the magnetic recording medium is a longitudinal magnetic recording medium, it tends to be difficult to carry out saturation recording by a conventional magnetic printing method on the magnetic recording medium having a high coercive force for high density, and it tends to be difficult to form a magnetic pattern having a high magnetic field intensity, and the full width at half maximum tends to be broad. According to the present invention, it becomes possible to form a good magnetic pattern even on such a perpendicular recording medium suitable for high recording density. Particularly, when the saturation magnetization of the magnetic layer is at least 50 emu/cc, the influence of the diamagnetic field tends to be significant, and the effect of the present invention tends to be large.

A higher effect will be obtained when the saturation magnetization is at least 100 emu/cc. However, if it is too high, it tends to be difficult to form a magnetic pattern, and accordingly it is preferably at most 500 emu/cc.

In a case where the magnetic recording medium is a perpendicular magnetic recording medium, the magnetic pattern is relatively large and the unit volume of one magnetic domain is large, the saturation magnetization tends to be intense, and flux reversal is likely to take place by magnetic demagnetization effect, which becomes noise to deteriorate the full width at half maximum. However, in the present invention, by the use of the base layer using a soft magnetic body, a good recording can be conducted on such a medium.

At least two such recording layers may be provided so as to increase the recording capacity. Here, it is preferred to interpose another layer between them.

In the present invention, it is preferred to form a protective layer on the magnetic layer. Namely, the outermost layer of the medium is covered with a hard protective layer. The protective layer prevents damage of the magnetic layer due to impact of the head or due to inclusion of dust or dirt with the mask. In a case where the magnetic pattern forming method using a mask is applied as in the present invention, the protective layer also functions to protect the medium from contact with the mask.

Further, in the present invention, the protective layer has an effect to prevent oxidization of the heated magnetic layer. The magnetic layer is likely to be oxidized in general, and it is more likely to be oxidized when heated. In the present invention, the magnetic layer is locally heated by e.g. the energy beam, and accordingly, it is preferred to preliminarily form a protective layer to prevent oxidization on the magnetic layer.

In a case where a plurality of the magnetic layers are formed, the protective layer may be formed on the magnetic layer which is closest to the surface. The protective layer may be formed directly on the magnetic layer or by means of a layer having another function as the case requires.

Part of the energy beam is absorbed on the protective layer, and functions to heat the magnetic layer locally due to thermal conductivity. Accordingly, if the protective layer is too thick, there is a fear that the magnetic pattern is unclear due to heat conduction, and accordingly the thickness is preferably thin. It is preferably thin also to make the distance between the head and the recording layer short during recording and reproducing. Accordingly, it is preferably at most 50 nm, more preferably at most 30 nm, furthermore preferably at most 20 nm. However, to obtain an adequate durability, it is preferably at least 0.1 nm, more preferably at least 1 nm.

The protective layer may be one which is hard and having a property resistant to oxidization. A carbonic material such as carbon, hydrogenated carbon, nitrogenated carbon, amorphous carbon or SiC, or $SiO_2$, $Zr_2O_3$, SiN or TiN, may, for example, be usually used. The protective layer may be made of the magnetic material.

Particularly, in order to make the distance between the head and the magnetic layer extremely short, it is preferred to form a very hard protective layer thinly. Accordingly, preferred is a carbonic material protective layer from the viewpoint of impact resistance and lubricity, particularly preferred is diamond-like carbon. It not only functions to prevent damage of the magnetic layer due to the energy beam, but also it greatly prevents damage of the magnetic layer due to the head. The magnetic pattern forming method of the present invention can be applied also to an opaque protective layer such as a carbonic material protective layer.

Further, the protective layer may be constituted by at least two layers. It is preferred to provide a layer consisting essentially of Cr as a protective layer directly on the magnetic layer, since the effect to prevent permeation of oxygen to the magnetic layer tends to be high.

It is preferred to further form a lubricant layer on the protective layer. It has a function to prevent damage of the medium due to the mask and the magnetic head. As a lubricant to be used for the lubricant layer, a fluorine type lubricant, a hydrocarbon type lubricant or a mixture thereof may, for example, be mentioned, and it may be coated by a conventional method such as dipping or spin coating. The layer may be formed by vapor deposition. The lubricant layer is preferably thin so as not to inhibit the magnetic pattern formation, and it is preferably at most 10 nm, more preferably at most 4 nm. It is preferably at least 0.5 nm to obtain an adequate lubricity. It is more preferably at least 1 nm.

In a case where the medium is irradiated with the energy beam on the lubricant layer, the lubricant may be coated again taking e.g. damage (decomposition, polymerization) of the lubricant into consideration.

Further, another layer may further be added to the above layer constitutions as the case requires.

The surface roughness Ra of the medium after formation of the magnetic pattern is preferably maintained to be at most 3 nm so as not to impair the running stability of the flying/contact head. Here, the medium surface roughness Ra is the roughness on the surface of the medium excluding the lubricant layer, and is a value obtained by measuring the roughness by means of a feeler type surface roughness meter (Model: Tencor P-12 disk profiler (manufactured by KLA Tencor)) with a measurement length of 400 μm, and calculating the measured value in accordance with JIS B0601. It is more preferably at most 1.5 nm.

The surface swell Wa on the medium after the magnetic pattern formation is preferably maintained to be at most 5 nm. Wa is the swell on the surface of the medium excluding the lubricant layer, and is a value obtained by measurement by means of a feeler type surface roughness meter (Model: Tencor P-12 disk profiler (manufactured by KLA Tencor)) with a measurement length of 2 mm, and calculating the measured value in accordance with Ra calculation. It is more preferably at most 3 nm.

Here, formation of the magnetic pattern on the magnetic recording medium thus constituted is conducted on the recording layer (magnetic layer). It is preferred to form the magnetic pattern by a method as described hereinafter after e.g. the protective layer and the lubricant layer are formed on the recording layer. However, in a case where there is no fear of oxidization of the recording layer, it may be formed immediately after the formation of the recording layer.

As a method of forming each layer of the magnetic recording medium, various methods may be employed, and direct current (magnetron) sputtering, high-frequency (magnetron) sputtering, ECR sputtering or physical vapor deposition such as vacuum deposition may, for example, be mentioned.

Further, as conditions during the layer formation, ultimate degree of vacuum, method of heating the substrate and the substrate temperature, the sputtering gas pressure, the bias voltage and the like are optionally determining depending upon properties of the medium to be obtained. For example, in a case of a sputtering layer formation, it is usually preferred that the ultimate degree of vacuum is at most $5 \times 10^{-6}$ Torr, the substrate temperature is from room temperature to 400° C., the sputtering gas pressure is from $1 \times 10^{-3}$ to $20 \times 10^{-3}$ Torr, and the bias voltage is from 0 to −500V.

In the case of heating the substrate, heating may be conducted before formation of the base layer. Otherwise, in a case of using a transparent substrate having a low heat absorption ratio, a seed layer consisting essentially of Cr or a base layer having a B2 crystal structure may be formed to increase the heat absorption ratio and the substrate may be heated, then the recording layer and the like may be formed.

In a case where the recording layer is a rare earth magnetic layer, such a method is preferred that the innermost circle portion and the outermost circle portion of the disk is masked firstly, and after formation of the recording layer, the mask is put off when the protective layer is formed so that the recording layer is completely covered with the protective layer, or in a case of two protective layers, the recording layer and the first protective layer are formed while the disk is masked, and the mask is put off when the second protective layer is formed so that the recording layer is completely covered with the second protective layer, whereby corrosion and oxidation of the rare earth magnetic layer can be prevented.

The magnetic recording apparatus of the present invention is a magnetic recording apparatus which comprises at least the above-described magnetic recording medium, a drive component which drives the medium in the recording direction, a magnetic head comprising a recording component and a reproducing component, a means which moves the magnetic head relatively to the magnetic recording medium, and a recording and reproducing signal processing means which inputs the signal to the magnetic head and outputs the reproducing signal from the magnetic head.

Further, the magnetic recording medium of the present invention may be used for a magnetic recording apparatus wherein the magnetic recording medium is incorporated in an apparatus, then the above magnetic pattern is reproduced by a magnetic head to obtain a signal, and using this signal as a standard, a servo burst signal is recorded by the magnetic head, whereby a precise servo signal can easily be obtained. Further, when the signal recorded as the magnetic pattern by the present invention remains in an area which is not used as a user data area after the servo burst signal is recorded at the magnetic head, the position of the magnetic head can easily be returned to the desired position when the position of the magnetic head is effected due to any disturbance, and accordingly the magnetic recording apparatus wherein signals by both recording methods are present is highly reliable.

The magnetic recording apparatus will be explained with reference to a magnetic disk apparatus which is typical as the magnetic recording apparatus.

A magnetic disk apparatus usually consists of a shaft which fixes one or plurality of magnetic disks in a skewered state, a motor which rotates the magnetic disk bonded to said shaft by means of a bearing, a magnetic head which is used for recording and/or reproducing, an arm to which said head is attached, and an actuator capable of moving the head to an optional position on the magnetic recording medium by means of the head arm. The head for recording and reproducing moves on the magnetic recording medium with a certain flying height. The recorded information is converted to a recording signal by means of a signal processing means, and recorded by the magnetic head. Further, the reproducing signal read by the magnetic head is inversed by means of the signal processing means to obtain a reproducing signal.

On the disk, the information signals are recorded along the concentric tracks in sector unit. The servo patterns are usually recorded between sectors. The magnetic head reads the servo signals from said patterns, carries out tracking accurately to the center of the track, and reads information signals in the sector. It similarly carries out tracking after recording.

As described above, the servo pattern which gives the servo signal is required to be particularly highly precise from the viewpoint that the pattern is used for tracking when information is recorded. Further, the servo pattern which is widely used at present comprises two sets of patterns having slippage by half pitch per track, and accordingly it is necessary to form the pattern per half pitch of the information signal, whereby twice as high precision is required.

However, by the conventional servo pattern forming method, by the influence of vibration generated due to difference in center of gravity between an outer pin and an actuator, the write track width is limited to the level of from 0.2 to 0.3 $\mu$m, and the precision of the servo pattern can not catch up with the increase of the track density, and accordingly precision of the servo pattern becomes a barrier to improvement in recording density of the magnetic recording apparatus and cost down.

According to the present invention, a high precision magnetic pattern can efficiently be formed, and accordingly a servo pattern can be formed with a high precision in a short period of time at a significantly low cost as compared with the conventional servo pattern forming method, and the track density of the medium can be increased to at least 40 kTPI for example. Accordingly, with the magnetic recording apparatus using the present medium, it is possible to carry out recording with a high density.

Further, when a phase servo system is employed, a servo signal which continuously changes to the position change of the head can be obtained, and accordingly there is a possibility that the track density can further be increased. Particularly when the magnetic pattern which gives a signal having a narrow full width at half maximum of the present invention is used, it is possible to carry out tracking at a width of at most 0.1 $\mu$m, and it is possible to carry out a higher density recording.

As mentioned above, in the phase servo system, a magnetic pattern inclined relative to the radius, which linearly extends from the inner circle to the outer circle, is used. Particularly in a servo magnetic pattern for tracking or a standard magnetic pattern for writing a servo pattern, linear magnetic patterns which form an angle of 90° with the relative movement direction of the magnetic head and an angle of 90°±θ° (0<θ≦45) are used. Namely, in a case of a magnetic disk, a linear pattern in a radius direction and a linear pattern inclined at within ±45° relative to the above pattern, are used. Such pattern which is continuous in a radius direction and inclined pattern have been difficult to form by the conventional servo pattern forming method of recording servo signals per track while rotating the disk, and complicated calculation and constitution have been required.

Figure 2:
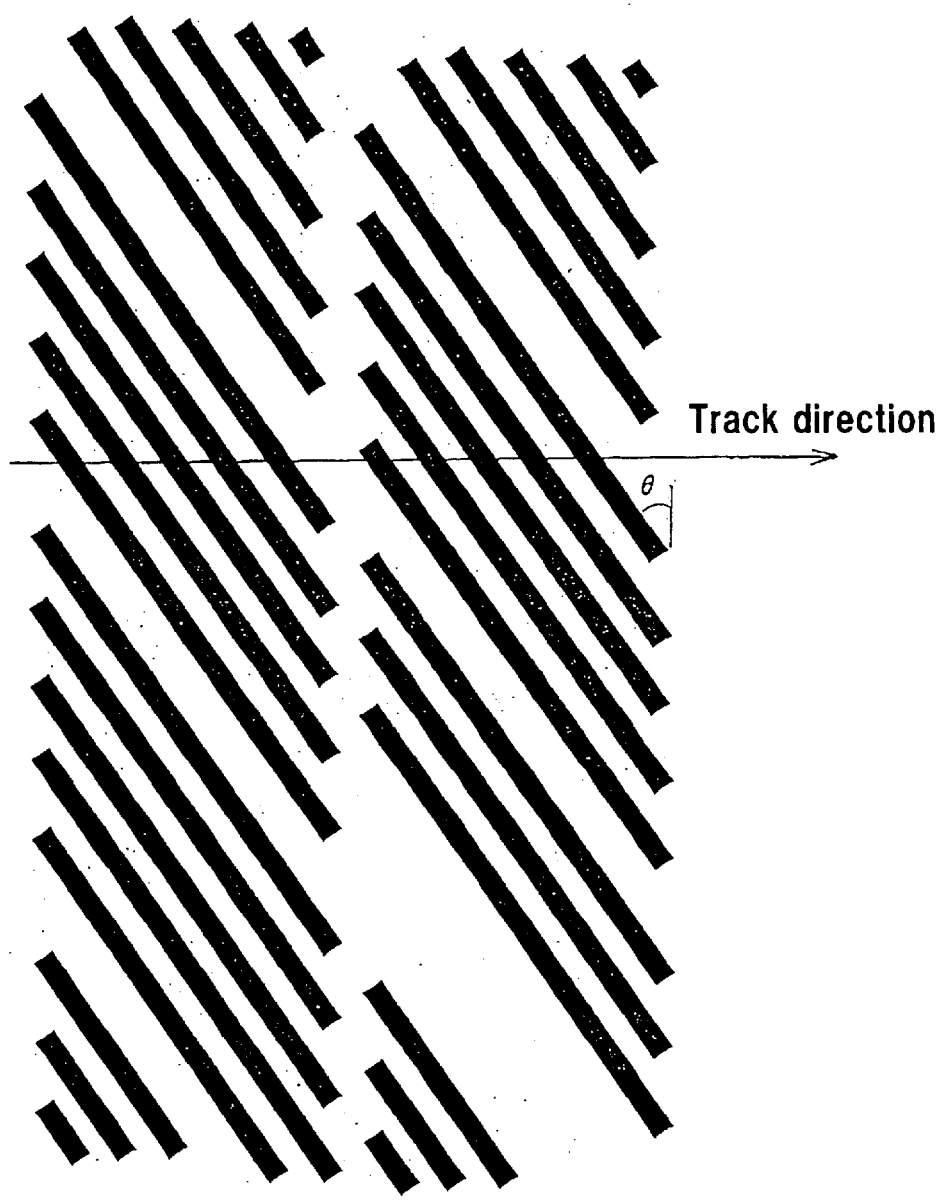
FIG. 2 is a diagram illustrating linear pattern lanes forming an angle of 55° with the running direction of a magnetic head (θ=35°).

However, according to the present invention, once a mask corresponding to the shape is prepared, inclined linear patterns (θ=35°) as illustrated in FIG. 2, for example, can easily be formed only by mask exposure at a desired position on the disk, and accordingly a medium having magnetic patterns having extremely high precision to be used for phase servo system can easily be prepared in a short period of time at a low cost. Consequently, a phase servo system magnetic recording apparatus with which a high density recording can be carried out, can be provided.

Further, by the above magnetic pattern forming method, magnetic patterns comprising at least two linear patterns which form angles of (90±θ$_1$) degree and (90±θ$_2$) degree (wherein θ$_1$>θ$_2$, 0<θ$_1$≦45 and 0≦θ$_2$<45), respectively, with the relative movement direction of the magnetic head, and which satisfy the formula:

$$P(90\pm\theta_1)/P(90\pm\theta_2) \geq 0.9 \times \cos(\theta_1-\theta_2)$$

where P(90±θ$_1$) and P(90±θ$_2$) are outputs of isolated pulses of the reproducing signals of the linear patterns, can be formed.

In a case where two linear patters wherein $\theta_1=35°$ and $\theta_2=0°$ are drawn, for example, $\theta_1=35°$ means a pattern inclined by 55° from the head running direction, and $\theta_2=0°$ means a pattern inclined by 90° relative to the head running direction, i.e. a pattern at right angles therewith.

In the case where $\theta_1=35°$ and $\theta_2=0°$ for example, $P(55°)/P(90°) \geq 0.9 \times \cos(35°) = 0.9 \times 0.819 = 0.737$, and accordingly the output of the linear pattern of 55° has to be at least about 74% of the output of the linear pattern of 90°.

Here, the cos(35°) is the azimuth loss of the output when the linear pattern having an inclination of 55° is reproduced while moving the magnetic head in a usual track direction. Namely, the above formula means that a linear pattern having any inclination is formed so that the reproducing signal is about the same level when the azimuth loss is subtracted. Namely, also in a case where the magnetic pattern for control is an inclined linear pattern, an output of at least predetermined level can be obtained, whereby the position precision of the magnetic head can be increased.

Here, in the case of the magnetic disk, the linear patterns are usually formed approximately radially in a radius direction, and may be somewhat curved corresponding to the movement direction of the head.

By the above-described conventional magnetic printing method, it tends to be difficult to form such inclined linear patterns.

For example, JP-A-50-60212 (U.S. Pat. No. 3,869,711) discloses a technique of magnetic printing on a tape and a disk by means of a master tape and a master disk obtained by using a soft magnetic material having a high magnetic permeability as a shield material, and discloses a so-like servo pattern as a pattern which can be magnetically printed on the tape medium.

It is certain that such a magnetic pattern can be formed, however, for a high coercive force medium having a coercive force of at least from 2,000 to 2,500 Oe, it is required to use, as a ferromagnetic body (shield material) for pattern of the master disk, a soft magnetic body having a high saturation magnetic flux density such as permalloy or Sendust, in order to secure the magnetic field intensity for printing.

However, in such a case, with respect to the pattern inclined relative to the running direction, it is possible to carry out recording, but only a pattern having a weak signal intensity can be formed.

Namely, with an inclined pattern, the magnetic field of the flux reversal is in a direction perpendicular to the gap made by the soft magnetic body of the master disk, whereby the magnetization cannot be inclined in a desired direction. As a result, the magnetic domains hardly face each other on a line, whereby no magnetic pattern having a narrow magnetic transition width can be formed.

The reproducing output of such a magnetic pattern significantly decreases more than the azimuth loss, relative to the pattern which forms an angle of 90° with the running direction of the magnetic head. Further, the full width at half maximum is broader than the full width at half maximum of the pattern formed by the method of the present invention, and there are many errors as the position information of the servo.

As an experimental example, a magnetic pattern ($\theta=35°$) as illustrated in FIG. 2 was formed by the magnetic printing method as disclosed in JP-A-50-60212, whereupon $P(55°)/P(90°)=0.6$, and it did not exceed 0.737. On the other hand, with respect to the pattern formed by the method of the present invention, it was 0.87 and exceeded 0.737 and satisfied the above formula.

The magnetic recording medium having the magnetic pattern for control preliminarily formed as mentioned above and the magnetic recording apparatus having said magnetic recording medium incorporated have high precision servo signal. Otherwise, the apparatus has a high precision standard signal, and accordingly a high precision servo signal can be written in the apparatus based on said standard signal.

As the magnetic head, a thin film head, a MR head, a GMR head or a TMR head may, for example, be used.

By constituting the reproducing component of the above magnetic head by a MR head, an adequate signal intensity can be obtained even with a high recording density, whereby a magnetic recording apparatus with a higher recording density can be realized.

Further, when this magnetic head is made to fly with a height lower than a conventional one with a flying height of at least 0.001 μm and less than 0.05 μm, the output improves, a high apparatus S/N can be obtained, and accordingly a magnetic recording apparatus having a large capacity and a high reliability can be provided.

Further, the recording density can further be improved when a signal processing circuit by a maximum likelihood decoding method is combined, and an adequate S/N can be obtained in a case of recording and reproducing with a recording density of at least 3G bit per square inch, at a line recording density of at least 250 kFCI at a track density of at least 13 kTPI.

Further, by using, as the reproducing component of the magnetic head, a GMR head consisting of plurality of electrically conductive magnetic layers which generate a significant change in resistance due to relative change of the respective magnetic directions by the external magnetic field and electrically conductive non-magnetic layers interposed between the electrically conductive magnetic layers, or a GMR head utilizing a spin/bulb effect, the signal intensity can further be increased, and it becomes possible to realize a highly reliable magnetic recording apparatus having a linear recording density of at least 350 kFCI with a recording density of at least 10 G bit per square inch.

Now, the present invention will be described in further detail with reference to Examples. However, it should be understood that the present invention is by no means restricted to such specific Examples.

Here, in the following Examples, the full width at half maximum of an isolated pulse of the reproducing signal and the output were evaluated as follows.

Namely, a magnetic disk was rotated at a number of revolutions of 4,200 rpm, and the output was carried out by a MR head with a read width of 0.9 μm. In the obtained reproducing signal waveform, the 0-to-peak value was taken as the maximum output. The pulse width at an output which is 50% of the maximum output was taken as a full width at half maximum. To secure the reliability, the average value of continuous 10 pulses was employed.

EXAMPLE 1

An aluminosilicate type glass substrate having a diameter of 2.5 inches was cleaned and dried, and on the substrate, 60 nm of NiAl, 10 nm of $Cr_{94}Mo_6$, 20 nm of $Co_{76}Cr_{13}Pt_8Ta_3$ as a recording layer, and 5 nm of carbon (diamond-like carbon) as a protective layer were formed at an ultimate degree of vacuum of $1 \times 10^{-7}$ Torr at a substrate temperature of 350° C. at a bias voltage of –200V under a sputtering gas pressure of Ar of $3 \times 10^{-3}$ Torr. The surface roughness Ra was 0.5 nm and the swell Wa was 0.8 nm. On the substrate, a fluorine type lubricant as a lubricant layer was coated in a thickness of 1.5 nm, followed by baking at 100° C. for 40 minutes to obtain a longitudinal magnetic disk for recording having a coercive force of 3,300 Oe at room temperature with a saturation magnetization of 310 emu/cc. The Curie temperature of the recording layer was 330° C.

To form a magnetic pattern, an electromagnet was constituted so that the magnetic field direction is the same as the rotation direction of the disk, and the magnetic field was applied with an intensity of about 10 kOe (about 10 KG) to homogeneously magnetize the disk plane.

Then, the magnetic disk was left to stand on a Cr mask having a transmission/non-transmission pattern as described hereinafter by means of a spacer having a thickness of 30 μm, and the angle was adjusted so that the pattern position of the mask was on the center of the spot of the laser, and the entire disk plane was irradiated with an excimer pulse laser beam having a wavelength λ of 248 nm under such conditions that pulse width: 25 nsec, power: 80 mJ/cm$^2$, spot: 10 mm×30 mm (the size of 1/e$^2$ of the peak energy), and frequency: 10 Hz, and at the same time, an external magnetic field was applied by a permanent magnet in a direction opposite to the direction of the preliminary homogeneous magnetization to make an attempt to form a magnetic pattern.

The external magnetic field during heating was changed to 1.2 KG, 1.6 KG and 2.1 KG.

The Cr mask comprises a glass sheet and a Cr layer in a thickness of about 20 nm formed on the glass sheet, and transmission portions having no Cr layer formed on the glass sheet are formed in an area within a portion at a radius of 15 mm to a portion at a radius of 30 mm. On the transmission portions, linear pattern lanes at an angle of 90° relative to the head running direction (θ=0°, lines and spaces with a width of 2 μm) and linear pattern lanes having an angle of 55° (θ=35°, lines and spaces with a width of 2 μm) are alternately formed in a circle direction every disk center angle of 5°. The former make a synchronous pattern and the latter make a phase servo pattern to detect the position information in a radius direction from the change of the phase. The convex portions are non-transmission portions and the concave portions are transmission portions, and the convex portions are closer to the disk.

In FIG. 5 is shown a schematic drawing illustrating a magnetic pattern forming apparatus of Example 1. On a turn table 6 fixed on a rotatable spindle 8, a mask 2 having a desired pattern formed thereon and a magnetic disk 1 are mounted by means of an inner spacer 10 and an outer spacer 11 and fixed to a fixation portion 5 for mask by e.g. screwing, followed by vacuum absorption by means of a groove 7 for fixing disk. This assembly is irradiated with laser beam 4 through a shading plate 3. The beam shape of the laser beam 4 becomes approximate fan shape after it is transmitted through the shading plate 3, and the laser beam reaches the mask 2, and the disk 1 is irradiated with the laser beam correspondingly to the pattern shape. Here, fine concaves and convexes are formed on the mask 2 correspondingly to the pattern to be formed, although they are not shown. Here, numeral 9 indicates an external magnetic field application magnet.

Figure 4:
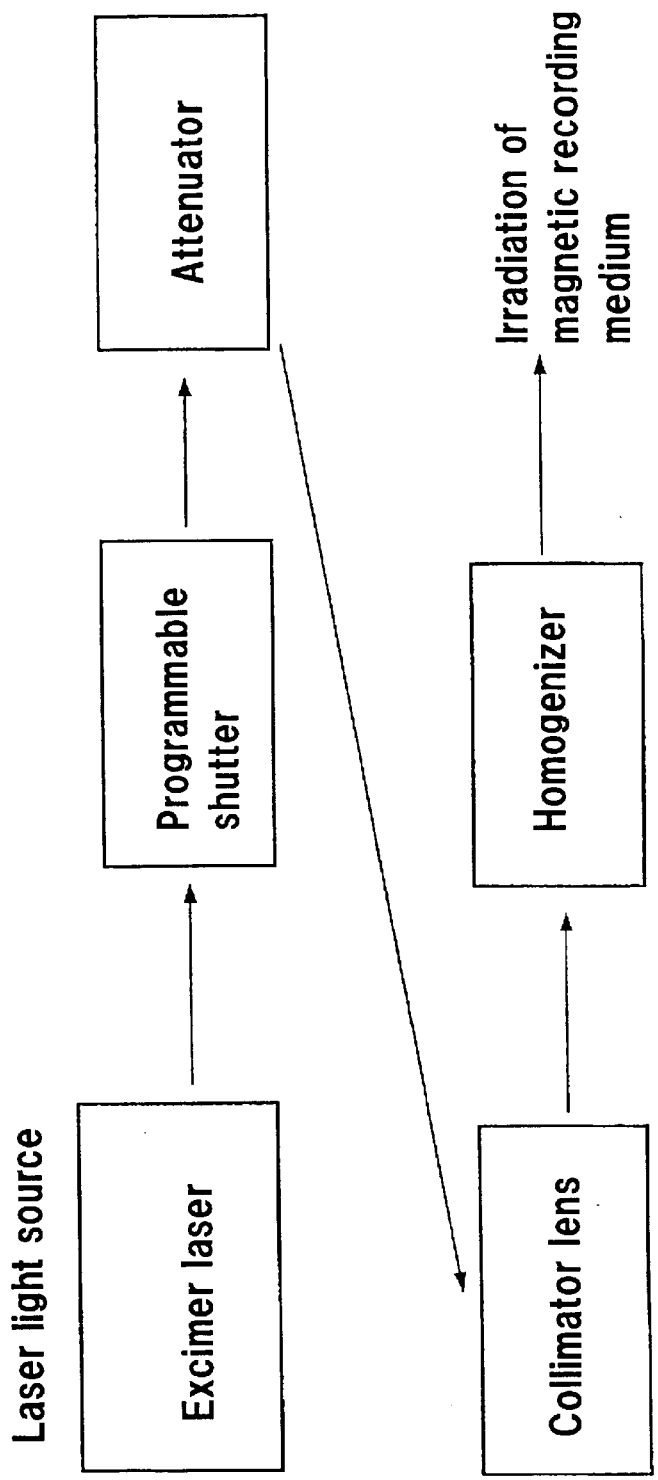
FIG. 4 is a flowchart illustrating a laser irradiation optical system employed in Examples of the present invention.

The optical system for laser irradiation is shown in FIG. 4. The laser beam emitted from a laser light source is transmitted through a programmable shutter, and then is transmitted through an attenuator, a collimator lens which enlarges the beam diameter to form parallel rays and a homogenizer which makes the beam intensity homogeneous, and then reaches the magnetic disk for irradiation.

The presence or absence of the formation of the magnetic pattern was confirmed by developing the magnetic pattern by a magnetic developer and observing the developed pattern by an optical microscope. As a result, the magnetic pattern for control corresponding to the transmission portions and the non-transmission portions of the mask could be obtained on the entire area corresponding to the area irradiated with laser beam.

Further, reproduction was carried out by means of a MR head having a read width of 0.9 μm to confirm the signal quality.

Figure 1D:
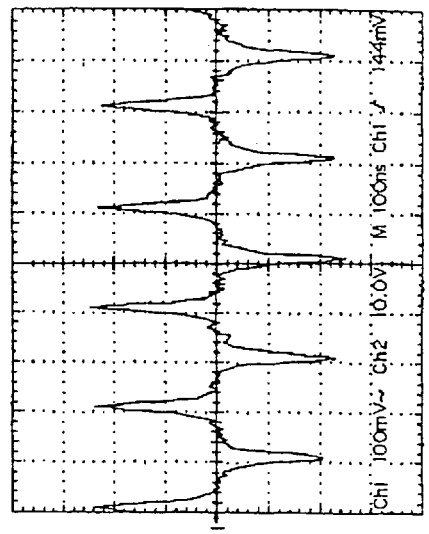
Figure 1A:
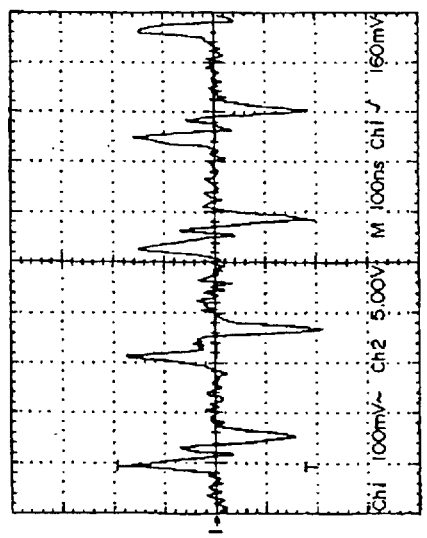
Figure 1C:
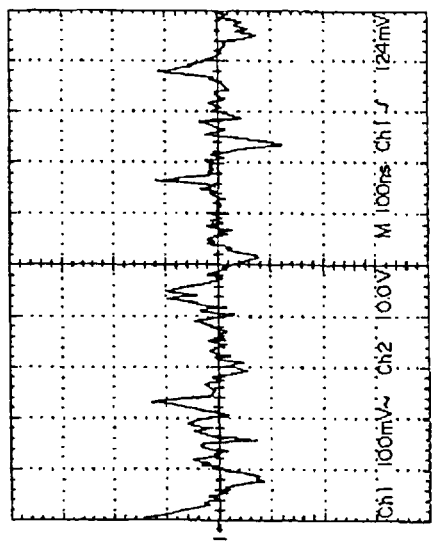

In FIGS. 1(a), 1(b) and 1(c) are shown reproducing signal waveforms of 90° linear patterns formed at external magnetic field intensities of 1.2 KG, 1.6 KG and 2.1 KG, respectively. Further, in FIG. 1(d) is shown a reproducing signal waveform of an information magnetic pattern having a width of 2 μm, saturation recorded by a magnetic head having a write width of 1.3 μm. The scale of the horizontal axis indicates 100 ns/Div, and the scale of the vertical axis indicates 100 mV/Div.

Further, in Table 1 is shown the full width at half maximum of an isolated pulse of the reproducing signal of the 90° linear pattern formed at each magnetic field intensity. Further, the full width at half maximum of an isolated pulse of the reproducing signal of the information magnetic pattern having a width of 2 μm, saturation recorded by the above magnetic head, is shown together.

TABLE 1

|  | Intensity of external magnetic field (kG) | | | Magnetic |
| --- | --- | --- | --- | --- |
|  | 1.2 | 1.6 | 2.1 | head |
| Full width at half maximum (ns) | 23.4 | 15.2 | 27.6 | 21.4 |

It was found from Table 1 that the full width at half maximum of the reproducing signal is best when the intensity of the external magnetic field is 1.6 kOe (1.6 KG), and the full width at half maximum at this intensity is narrower than that of the saturation recording by a magnetic head at room temperature, and the reproducing signal is excellent as the servo signal. Further, the output of the reproducing signal of the 90° linear pattern was 320 mV when the intensity of the external magnetic field was 1.6 kOe.

Then, a 55° linear pattern formed at an external magnetic field intensity of 1.6 kOe was reproduced to measure the output of the reproducing signal, and it was 275 mV.

Since P(55°)/P(90°)=0.859 and 0.9×cos(35°)=0.9×0.819=0.737, the magnetic pattern formed by the present Example satisfies the formula P(55°)/P(90°)≧0.9×cos(35°).

As mentioned above, by using a magnetic recording medium having a narrow full width at half maximum, the interference with the adjacent signal decreases, and the linear recording density of the signal for control can be increased. Namely, the number of signals for control stored in one cycle of the magnetic recording medium with the same occupied area can be increased, the band width of the signal for control can be increased, and the signals to be used for control can be increased, whereby the medium tends to be resistant to flaws.

Further, with the magnetic recording medium having a magnetic pattern for control with a high precision formed thereon, the position control of the magnetic head can be carried out with a high precision, whereby the track density can be increased, and it becomes possible to carry out a high density recording. Further, since the synchronous precision improves, the gap can be decreased, and the recording capacity can further be increased. With the magnetic recording apparatus having this magnetic recording medium incorporated, the position control of the magnetic head can be carried out with a high precision, and the synchronous precision increases, and accordingly it becomes possible to carry out a high density and high capacity recording.

EXAMPLE 2

A magnetic disk was prepared in the same manner as in Example 1, a magnetic pattern for control was formed, and the evaluation was carried out.

However, the magnetic field intensity was 1.6 KG, and the thickness of the spacer was changed to 15, 25, 40 or 100 μm to change the space between the mask and the medium.

Figure 3:
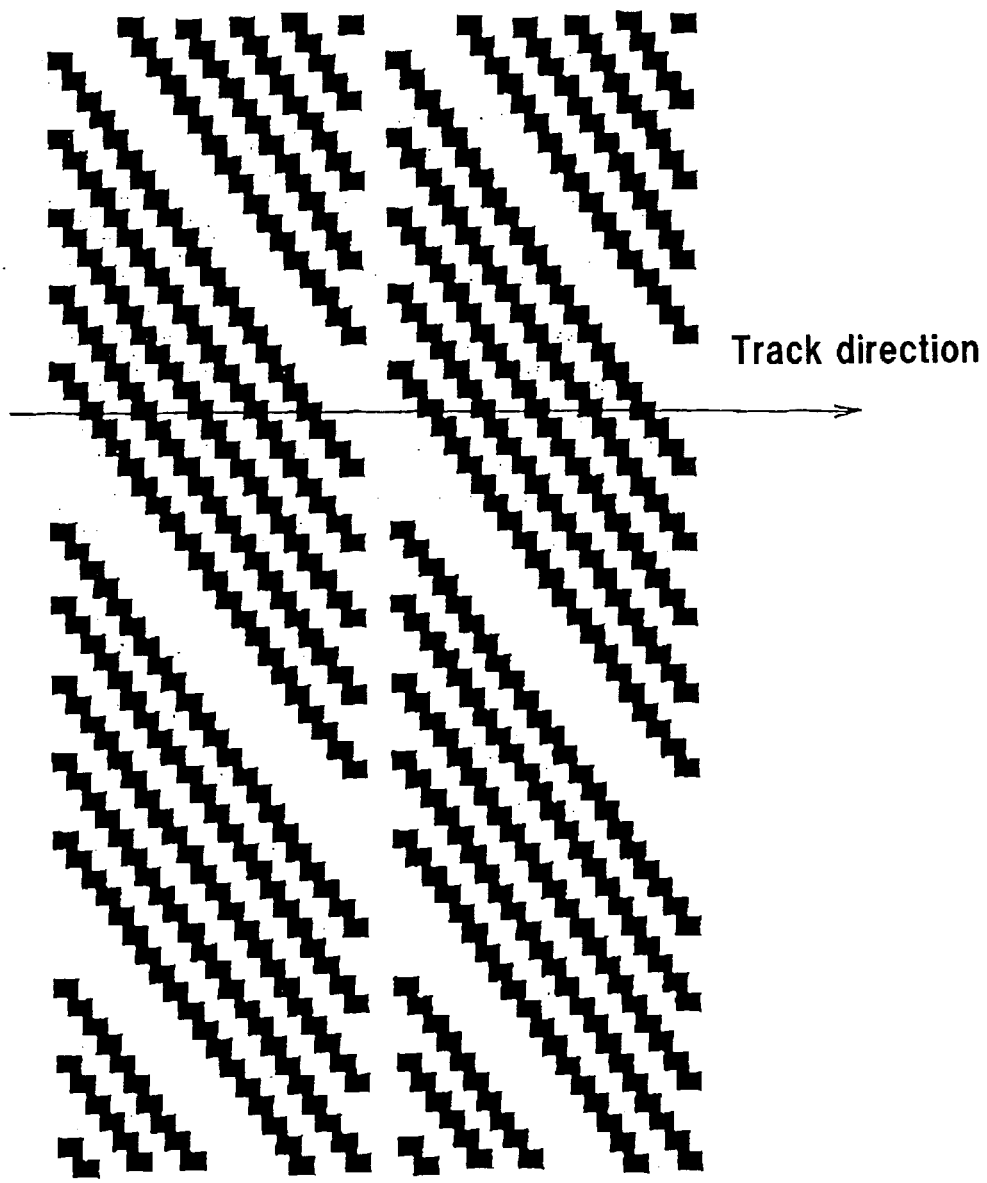
FIG. 3 is a diagram illustrating stepwise pattern lanes forming an angle of 55° with the running direction of a magnetic head (θ=35°).

In Table 2 are shown the full width at half maximum of an isolated pulse of the reproducing signal of the 55° linear pattern and the output. Further, the full width at half maximum of an isolated pulse of the reproducing signal of a pattern which forms an angle of 55° (θ=35°) with the running direction of the head, formed by shifting the track positions by 0.3 μm in a radius direction by the magnetic head as illustrated in FIG. 3, and the output, are shown together.

TABLE 2

| | Thickness of spacer (μm) | | | | Magnetic head |
|---|---|---|---|---|---|
| | 15 | 25 | 40 | 100 | |
| Full width at half maximum (ns) | 36.3 | 40.1 | 43.5 | 64.7 | 51.8 |
| Output (mV) | 281 | 278 | 264 | 211 | 230 |

As compared with the signal written by the magnetic head, the full width at half maximum is excellent and the output is at the same level, except for one having a space between the mask and the medium of 100 μm.

As mentioned above, by using a magnetic recording medium having a narrow full width at half maximum, the interference with the adjacent signal decreases, and the linear recording density of the signal for control can be increased. Namely, the number of signals for control stored in one cycle of the magnetic recording medium with the same occupied area can be increased, the band width of the signal for control can be increased, and the signals to be used for control can be increased, whereby the medium tends to be resistant to flaws.

Further, with the magnetic recording medium having a magnetic pattern for control with a high precision formed thereon, the position control of the magnetic head can be carried out with a high precision, whereby the track density can be increased, and it becomes possible to carry out a high density recording. Further, since the synchronous precision improves, the gap can be decreased, and the recording capacity can further be increased. With the magnetic recording apparatus having this magnetic recording medium incorporated, the position control of the magnetic head can be carried out with a high precision, and the synchronous precision increases, and accordingly it becomes possible to carry out a high density and high capacity recording.

EXAMPLE 3

An aluminosilicate type glass substrate having a diameter of 2.5 inches was cleaned and dried, and on the substrate, 40 nm of $Cr_{90}Ti_{10}$, 20 nm of $Co_{65}Cr_{35}$, 80 nm of $Co_{71}Cr_{19}Pt_{10}$ as a recording layer, and 5 nm of carbon (diamond-like carbon) as a protective layer are formed at an ultimate degree of vacuum of $1\times10^{-7}$ Torr at a substrate temperature of 350° C. at a bias voltage of −200V under a sputtering gas pressure of Ar of $3\times10^{-3}$ Torr. The surface roughness Ra was 0.6 nm and the swell Wa was 0.9 nm. On the substrate, a fluorine type lubricant as a lubricant layer was coated in a thickness of 1.5 nm, followed by baking at 100° C. for 40 minutes to obtain a perpendicular magnetic disk for recording having a coercive force of 2,500 Oe at room temperature with a saturation magnetization of 380 emu/cc. The Curie temperature of the recording layer was 310° C.

To form a magnetic pattern, an electromagnet was constituted so that the magnetic field direction is perpendicular to the disk plane, and the magnetic field was applied with an intensity of about 10 kOe (about 10 KG) to homogeneously magnetize the disk plane.

Then, a magnetic pattern was formed in the same manner as in Example 1 except that the spacer thickness was 25 μm, the power of the excimer pulse laser was 70 mJ/cm², and the external magnetic field of 0.9 KG was applied in the direction opposite to the initial homogeneous magnetization in a perpendicular direction.

The presence or absence of the formation of the magnetic pattern was confirmed by developing the magnetic pattern by a magnetic developer and observing the developed pattern by an optical microscope. As a result, the magnetic pattern for control corresponding to the transmission portions and the non-transmission portions of the mask could be obtained on the entire area corresponding to the area irradiated with laser beam.

Further, reproducing was carried out by means of a MR head with a read width of 0.9 μm to confirm the signal quality, and the full width at half maximum of an isolated pulse of the reproducing signal of the 90° linear pattern was 14.3 ns. On the other hand, the full width at half maximum of an isolated pulse of the reproducing signal of the information magnetic pattern having a width of 2 μm, saturation recorded by a magnetic head having a write width of 1.3 μm, was 16.4 ns. Here, since perpendicular recording was carried out, the comparison of the full width at half maximum was carried out after treatment of the signal waveform by a differential circuit.

Accordingly, it is found that the full width at half maximum is narrower than that of saturation recording by a magnetic head at room temperature also in the perpendicular recording, and that the reproducing signal is excellent as the servo signal.

As mentioned above, by using a magnetic recording medium having a narrow full width at half maximum, the interference with the adjacent signal decreases, and the linear recording density of the signal for control can be increased. Namely, the number of signals for control stored in one cycle of the magnetic recording medium with the same occupied area can be increased, the band width of the signal for control can be increased, and the signals to be used for control can be increased, whereby the medium tends to be resistant to flaws.

Further, with the magnetic recording medium having a magnetic pattern for control with a high precision formed thereon, the position control of the magnetic head can be carried out with a high precision, whereby the track density can be increased, and it becomes possible to carry out a high density recording. Further, since the synchronous precision improves, the gap can be decreased, and the recording capacity can further be increased. With the magnetic recording apparatus having this magnetic recording medium incorporated, the position control of the magnetic head can be carried out with a high precision, and the synchronous precision increases, and accordingly it becomes possible to carry out a high density and high capacity recording.

EXAMPLE 4

A magnetic disk was prepared in the same manner as in Example 1, a magnetic pattern for control was formed, and the evaluation was carried out.

However, the magnetic field intensity was 1.7 KG, the power of the excimer pulse laser was 170 mJ/cm$^2$, and the thickness of the spacer was so small as 5 μm. Here, as a mask pattern, the same one as in Example 1 was used.

The presence or absence of the magnetic pattern was confirmed by developing the magnetic pattern by a magnetic developer and observing the developed pattern by an optical microscope. As a result, the magnetic pattern for control corresponding to the transmission portions and the non-transmission portions of the mask could be obtained on the entire area corresponding to the area irradiated with laser beam.

The evaluation of the full width at half maximum of an isolated pulse of the reproducing signal of the magnetic pattern formed was carried out by means of a magnetic head having a write width of 0.75 μm and a read width of 0.45 μm. As a result, the full width at half maximum was 8.5 nsec with a 90° linear pattern, and it was 15.4 nsec with a linear pattern having an inclination of 55°. On the other hand, the full width at half maximum of an isolated pulse of the reproducing signal of the information magnetic pattern having a width of 2 μm, saturation recorded by a magnetic head of the same magnetic head (write width 0.75 μm), was 9.2 ns.

Namely, in a case where reproducing was carried out by a magnetic head having a narrow gap to be used for high density recording, the full width at half maximum was narrower than that of the reproducing waveform when a pattern was written by a magnetic head, and the usefulness of the present invention in a high density recording was proved.

Further, the reproducing output of the 55° linear pattern formed in this Example was 110 mV, and the reproducing output of the 90° linear pattern was 143 mV. Accordingly, P(55°)/P(90°)=0.77, and the formula P(55°)/P(90°)≧0.9×cos(35°)=0.737 was satisfied.

As mentioned above, by using a magnetic recording medium having a narrow full width at half maximum, the interference with the adjacent signal decreases, and the linear recording density of the signal for control can be increased. Namely, the number of signals for control stored in one cycle of the magnetic recording medium with the same occupied area can be increased, the band width of the signal for control can be increased, and the signals to be used for control can be increased, whereby the medium tends to be resistant to flaws.

Further, with the magnetic recording medium having a magnetic pattern for control with a high precision formed thereon, the position control of the magnetic head can be carried out with a high precision, whereby the track density can be increased, and it becomes possible to carry out a high density recording. Further, since the synchronous precision improves, the gap can be decreased, and the recording capacity can further be increased. With the magnetic recording apparatus having this magnetic recording medium incorporated, the position control of the magnetic head can be carried out with a high precision, and the synchronous precision increases, and accordingly it becomes possible to carry out a high density and high capacity recording.

As explained above, with the magnetic recording medium of the present invention having a high precision magnetic pattern for control formed thereon, the position control of the magnetic head can be carried out with a high precision, whereby the track density can be increased, and it is possible to carry out a high density recording. Further, since the synchronous precision improves, the gap can be decreased, and the recording capacity can further be increased. With a magnetic recording apparatus having this magnetic recording medium incorporated, the position control of the magnetic head can be carried out with a high precision, and the synchronous precision improves, and accordingly it becomes possible to carry out a high density and high capacity recording.

Further, according to the method of forming the magnetic pattern on a magnetic recording medium of the present invention, such a high precision magnetic pattern for control can be formed in a short period of time at a low cost.

The entire disclosures of Japanese Patent Application Nos. 2000-142957 filed on May 16, 2000 and 2000-197559 filed on Jun. 30, 2000 including specification, claims, drawings and summary are incorporated herein by reference in their entireties.

What is claimed is:

1. A magnetic recording medium for recording information by forming a magnetic pattern for information thereon by a magnetic head, which is a longitudinal magnetic recording medium having a coercive force of at least 3000 Oe, and which has a magnetic pattern for control of the magnetic head preliminarily formed thereon, wherein the full width at half maximum of an isolated pulse of a reproducing signal of the magnetic pattern for control is smaller than the full width at half maximum of an isolated pulse of a reproducing signal of the magnetic pattern for information.

2. The magnetic recording medium according to claim 1, wherein the coercive force is at least 3300 Oe.

3. A magnetic recording medium for recording information by forming a magnetic pattern for information thereon by a magnetic head, which is a perpendicular magnetic recording medium, and which has a magnetic pattern for control of the magnetic head preliminarily formed thereon, wherein the full width at half maximum of an isolated pulse of a reproducing signal of the magnetic pattern for control is smaller than the full width at half maximum of an isolated pulse of a reproducing signal of the magnetic pattern for information.

4. The magnetic recording medium according to claim 3, wherein the coercive force is at least 2500 Oe.

5. The magnetic recording medium according to claim 1 or 3, wherein the full width at half maximum of an isolated pulse of a reproducing signal of the magnetic pattern for control is at most 95% of the full width at half maximum of an isolated pulse of a reproducing signal of the magnetic pattern for information.

6. The magnetic recording medium according to claim 1 or 3, wherein the full width at half maximum of an isolated pulse of a reproducing signal of the magnetic pattern for control is at most 90% of the full width at half maximum of an isolated pulse of a reproducing signal of the magnetic pattern for information.

7. A magnetic recording medium for recording information by forming a magnetic pattern for information thereon by a magnetic head, which has a magnetic pattern for control of the magnetic head preliminarily formed thereon, wherein the magnetic pattern for control comprises at least two types of linear patterns which form angles of $(90°±θ_1°)$ and $(90°±θ_2°)$ wherein $θ_1>θ_2$, $0°<θ_1≦45°$ and $0°≦θ_2<45°$, respectively, with the relative movement direction of the magnetic head, and which satisfy the formula:

$$P(90±θ_1)/P(90±θ_2) ≧ 0.9×\cos(θ_1-θ_2)$$

where $P(90±θ_1)$ and $P(90±θ_2)$ are outputs of the isolated pulses of the reproducing signals of said linear patterns.

8. The magnetic recording medium according to any one of claims 1, 3 and 7, wherein the magnetic pattern for control is a magnetic pattern for position control by phase control.

9. The magnetic recording medium according to any one of claims 1, 3 and 7, which comprises a substrate and a magnetic layer formed on the substrate, wherein the temperature at which magnetization of the magnetic layer is erased is at least 100° C.

10. The magnetic recording medium according to any one of claims 1, 3 and 7, which has a surface roughness Ra of at most 3 nm.

11. A method for producing the magnetic recording medium as defined in any one of claims 1, 3 and 7, which comprises a step of locally heating a magnetic layer on the medium, and a step of applying an external magnetic field to the magnetic layer of the medium to form a magnetic pattern for control.

12. The method according to claim 11, which comprises applying an external magnetic field to preliminarily magnetize the magnetic layer homogeneously in a desired direction, and simultaneously with the local heating of the magnetic layer of the medium, applying an external magnetic field to magnetize the heated area in a direction opposite to the above desired direction to form the magnetic pattern for control.

13. A magnetic recording apparatus which comprises a magnetic recording medium as defined in any one of claims 1, 3, and 7, a driving component which drives the magnetic recording medium in a recording direction, a magnetic head comprising a recording component and a reproducing component, a means of moving the magnetic head relatively to the magnetic recording medium, and a recording/reproducing signal processing means which inputs a recording signal to the magnetic head and outputs a reproducing signal from the magnetic head, to form a magnetic pattern for information on the magnetic recording medium by the magnetic head for recording information.

14. The magnetic recording apparatus according to claim 13, which reproduces, after the magnetic recording medium is incorporated therein, the magnetic pattern for control by the magnetic head to obtain a signal, and records a servo burst signal by the magnetic head using the above signal as a standard.

15. The magnetic recording medium according to any one of claims 1, 3 and 7, which comprises a substrate, and a magnetic layer and a protective layer formed in this order on the substrate.

16. The magnetic recording medium according to claim 15, wherein the protective layer has a thickness of at most 50 nm.

17. The magnetic recording medium according to claim 15, wherein the protective layer is made of a diamond-like carbon.

18. The magnetic recording medium according to claim 15, which has a lubricant layer formed on the protective layer.

19. The magnetic recording medium according to claim 18, wherein the lubricant layer has a thickness of at most 10 nm.

* * * * *